US005529703A

United States Patent [19]

Sprenger et al.

[11] Patent Number: 5,529,703

[45] Date of Patent: Jun. 25, 1996

[54] INDUCTION DRYER AND MAGNETIC SEPARATOR

[75] Inventors: Robert A. Sprenger, Felton; Douglas F. Shepherd, San Jose, both of Calif.

[73] Assignee: Nordson Corporation, Westlake, Ohio

[21] Appl. No.: 295,083

[22] Filed: Aug. 24, 1994

Related U.S. Application Data

[63] Continuation of Ser. No. 832,987, Feb. 10, 1992, which is a continuation-in-part of Ser. No. 621,231, Nov. 30, 1990, abandoned, which is a continuation-in-part of Ser. No. 532,945, Jun. 4, 1990, abandoned.

[51] Int. Cl.[6] .......... B23K 13/01

[52] U.S. Cl. .......... 219/604; 219/650; 219/653; 219/660; 219/672

[58] Field of Search .......... 219/602, 603, 219/604, 607, 610, 614, 635, 647, 650, 653, 660, 661, 672, 674, 608

[56] References Cited

U.S. PATENT DOCUMENTS

| | | | |
|---|---|---|---|
| 2,489,867 | 11/1949 | D'orio | 219/10.79 |
| 3,449,539 | 6/1969 | Scheffler et al. | 219/10.71 |
| 3,523,602 | 8/1970 | Mojden et al. | 198/690 |
| 3,694,609 | 9/1972 | Kennedy | 219/10.79 |
| 3,727,982 | 4/1973 | Itoh et al. | 299/14 |
| 3,790,735 | 2/1974 | Peters | 219/10.75 |
| 3,830,353 | 8/1974 | Mojden | 198/20 R |
| 3,840,138 | 10/1974 | Mohr | 219/10.57 |
| 3,966,426 | 6/1976 | McCoy et al. | 219/10.79 |
| 4,017,704 | 4/1977 | Collins, III et al. | 219/10.79 |
| 4,160,891 | 7/1979 | Scheffler | 219/10.69 |
| 4,272,313 | 6/1981 | Mori et al. | 156/262 |
| 4,296,294 | 10/1981 | Beckert et al. | 219/10.41 |
| 4,307,276 | 12/1981 | Kurata et al. | 219/10.41 |
| 4,315,568 | 2/1982 | Mojden | 198/690 |
| 4,323,150 | 4/1982 | Mojden | 198/690 |
| 4,333,246 | 6/1982 | Sullivan et al. | 34/23 |

(List continued on next page.)

FOREIGN PATENT DOCUMENTS

| | | | |
|---|---|---|---|
| 70392 | 9/1985 | China . | |
| 0067235 | 12/1982 | European Pat. Off. . | |
| 0509374A1 | 10/1992 | European Pat. Off. | B05D 3/02 |
| 56-030048 | 3/1981 | Japan . | |
| 2111815 | 4/1990 | Japan . | |

OTHER PUBLICATIONS

Zinn, Stanley and Semiatin, S. L., "Coil design and fabrication: basic design and modifications", *Heat Treating,* (Jun. 1988), pp. 32–36.

Zinn, Stanley and Semiatin, S. L., "Coil design and fabrication: part 2, specialty coils", *Heat Treating,* (Aug. 1988), pp. 29–32.

Zinn, Stanley and Semiatin, S. L., "Coil design and fabrication: part 3, fabrication principles", *Heat Treating,* (Oct. 1988), pp. 39–41.

(List continued on next page.)

*Primary Examiner*—Tu Hoang
*Attorney, Agent, or Firm*—Fliesler, Dubb, Meyer & Lovejoy

[57] ABSTRACT

Apparatus for inductively heating metal can lids operates at medium frequency, with a many-turn induction coil wrapped partly or entirely around the can closures. No focusing cores are required, nor need the conductors be water cooled. Can ends may be fed through the apparatus in-stick. IGBTs are used in the H-bridge of the inverter. A control system is also provided which minimizes peak current flow through the switches and obviates the need for a series inductor conventionally used for current limiting. The control system monitors the tank voltage phase angle and turns the switches on and off in optimal response thereto. Can lids are separated magnetically while being motivated by sequentially switched electromagnets, and can bodies may be rotated by a split conveyor belt while being transported through inductive heating apparatus. Closed-loop temperature control apparatus may also be included to control AC power input and to prevent overheating of the can closures in the event of unintended stoppage of the production line.

87 Claims, 19 Drawing Sheets

U.S. PATENT DOCUMENTS

| | | | |
|---|---|---|---|
| 4,339,645 | 7/1982 | Miller | 219/10.491 |
| 4,351,430 | 9/1982 | Mojden | 198/690 |
| 4,364,466 | 12/1982 | Mojden | 198/690 |
| 4,481,397 | 11/1984 | Maurice et al. | 219/10.61 R |
| 4,490,922 | 1/1985 | Gorodetsky et al. | 34/1 |
| 4,531,037 | 7/1985 | Camus | 219/10.75 |
| 4,582,972 | 4/1986 | Curtin et al. | 219/10.69 |
| 4,673,781 | 6/1987 | Nuns et al. | 219/10.491 |
| 4,775,772 | 10/1988 | Chaboseau | 219/10.61 R |
| 4,810,843 | 5/1989 | Wicker et al. | 219/10.43 |
| 4,846,774 | 7/1989 | Bell | 493/87 |
| 4,848,598 | 7/1989 | Nozaki et al. | 219/10.41 |
| 5,325,601 | 7/1994 | Brownewell et al. | 34/247 |

OTHER PUBLICATIONS

Zinn, Stanley and Semiatin, S. L., "Elements of Induction Heating", Electric Power Research Institute, Inc. and ASM International, (1988), pp. 1–8, 47–75, 85–141, 185–226.

Hassell, Peter A., "Medium Frequency Induction Melting—Its Control and Effective Operation", *Industrial Heating* (Mar. 1982), pp. 18, 20–21.

Smith, T., "Atomic energy technology applied in liquid metal processing", *Metallurgia* (Apr. 1990), vol. 57, No. 4, p. 174.

Schaufler, K., "Stationary and Mobile Medium–Frequency Plant for Induction Heating", *Brown Bover; Review* (Feb. 1978), vol. 65, pp. 88–95.

Akherraz, M. and Taj, E., "Medium Frequency Self Controlled Converter for Induction Heating Applications", Melecon '89 Proceedings, pp. 43–46 (1989).

James, P. A., "General considerations for the choice of medium frequency for induction melting", elektrowarme international 41 (1983) B3 Jun., pp. B 138–B 146.

Sears, Roebuck & Co., "Kenmore Induction Cooktop", Product Brochure (1985).

W. R. Grace & Co.; "Can end Preheat Systems", Product Brochure (undated).

Ned Mohan, Tore M. Undeland, William P. Robbins, "Power Electronics: Converters, Applications, and Design", John Wiley & Sons (1989).

Lester R. Moskowitz, "Permanent Magnet Design and Application Handbook", Robert E. Krieger Publishing Company (1976).

INDUCTION DRYER AND MAGNETIC SEPARATOR

This application is a continuation of application Ser. No. 07/832,987, filed Feb. 10, 1992, which is a continuation-in-part of U.S. patent application Ser. No. 07/621,231, filed Nov. 30, 1990, abandoned which is a continuation-in-part of U.S. patent application Ser. No. 07/532,945, filed Jun. 4, 1990, abandoned. The above three patent applications are hereby incorporated by reference.

BACKGROUND OF THE INVENTION

1. Field of the Invention

The present invention relates to a method for heating or otherwise treating metal objects, and more particularly, to a method and apparatus for inductively heating or otherwise treating metal can lids (closures, ends) or can bodies for drying, curing or other purposes, for maintaining a spacing between them, and for motivating them along a path.

2. Description of Related Art

Closures for metal beverage containers are generally of a circular shape with a flanged perimeter called a curl. The closures are usually made of aluminum or steel, and the curl is used in attaching the closure to a can body through a seaming operation. To aid the integrity of the seal thus formed between the can body and the closure, it is a common practice to apply a bead of sealant or adhesive ("compound") within the curl during manufacture of the closure. Different types of coatings are also selectively or generally applied to can closures and can bodies for various other purposes as well, for example, to repair damaged coatings. For the purposes of the present description, coatings, sealants and adhesives are all considered to be "liquids" applied to a workpiece.

One problem which arises in this manufacturing operation is the curing or drying of such liquids. Recently there has been increased interest in the use of water-based sealants in the container industry, which may take 3–4 days to dry to an acceptable state for application of the closure to a can body. This was not a severe problem for solvent-based liquids, because the volatile solvent quickly evaporates and is acceptably dry for application of the closure to a can body typically within 48 hours.

In the past, can closures were heated to aid the drying or curing process typically either by infrared radiation or convection heating. These systems, especially the convection heating systems, tended to be large, bulky and expensive to operate due to inefficient energy usage.

Attempts have also been made to heat can ends inductively. Induction heating of electrically conductive articles involves passing an oscillating current through a work coil to create an oscillating magnetic field in which the electrically conductive workpiece is placed. Heat is produced in the workpiece as a result of eddy current losses resulting from circulating currents induced in the workpiece by the field.

FIG. 1 shows a typical electrical circuit for inductive heating. It comprises a DC power supply 110 with an H-bridge 130 connected across its outputs. The H-bridge 130 is made up of four thyristors 112, 114, 116 and 118, and coupled across the H-bridge is a parallel resonant tank circuit 120 in series with a current-limiting inductor 122. The tank circuit 120 includes the work coil 124, a load represented by an equivalent resistance 126, and a capacitor 128, all coupled in parallel.

In steady state operation, energy is coupled back and forth between the capacitor 128 and the inductor 124, resulting in an oscillating voltage across the tank circuit 120. In order to compensate for energy losses through equivalent resistance 126, control circuitry (not shown) periodically activates the thyristors of the H-bridge in order to pump additional energy into the tank circuit 120. The oscillating voltage has a frequency which varies somewhat depending on the load (i.e. workpiece) present in the heater at any given point in time, but prior systems have not taken this into account in determining when to activate the thyristors except possibly in a gross manner, applied over a long period of time.

The series inductor 122 is sometimes inserted to reduce the current peaks into the tank circuit 120 when the thyristors are activated, and to protect against large current surges in the event of malfunction. The current flow through the thyristors still can be enormous, however, requiring water (or liquid) cooling both of the thyristors themselves and of the wires coupling the power supply 110 to the H-bridge 130 and the H-bridge 130 to the tank circuit 120.

A typical induction heating circuit operating at high frequencies (on the order of 100 kHz) may use power MOSFETs as the switches in the H-bridge since MOSFETs can turn on and off very quickly. MOSFETs capable of operating at the higher voltages of induction heating circuits have a high on resistance, however, so they still need to be water cooled. Some induction heating circuits may use SCRs in the H-bridge, but although SCRs can turn on and off quickly, they are difficult to control. Standard bipolar transistors require large base current amplifiers to operate and do not work well at high switching speeds and at the high currents which the H-bridge must carry in the circuit of FIG. 1.

One problem with prior art inductive heating methods which might be used to heat can closures derives from the fact that in the past they have typically operated at high frequencies (on the order of 100 kHz), which tends to minimize the depth to which any currents are generated in the can closure. This meant that the oscillating currents in conductors traveling to and in the work coil also traveled primarily along the outside surface of these conductors (the "skin effect"). The current density along the outside surface of these conductors was therefore very high, causing excessive heating and necessitating water cooling. Typically, in fact, these conductors were constructed using copper tubing with water flowing through the center.

Heating of can ends by induction has been difficult also because they are made of sheet metal. Induction heating at high frequencies creates problems of non-uniform heating. Various portions of a sheet metal workpiece have been heated to greatly varying temperatures depending on proximity to the coil and other factors. Consequently, localized overheating can easily and frequently does occur, even before other parts of the workpiece are heated to a desired temperature. Collins U.S. Pat. No. 4,017,704 attempts to solve this problem by placing metal can ends flat on a conveyor belt and passing them under an ordinary few-turn, high-frequency induction heating coil having a generally open center area, and a bow tie-shaped core disposed adjacent to the center of the coil in order to focus the energy more uniformly into the can ends. Even if Collins' technique were successful for heating can ends uniformly, however, the technique still requires focusing cores and water-cooled wires (copper tubing) and switches.

In addition to Collins, induction heating apparatus in general, although not necessarily addressing the special problems of can ends and can bodies, is also shown in the following U.S. Pat. Nos.: 4,339,645 to Miller, 4,481,397 to Maurice, 4,296,294 to Beckert, 4,849,598 to Nozaki, 4,160,891 to Scheffler, 3,449,539 to Scheffler, 4,307,276 to Kurata, 4,582,972 to Curtin, 4,673,781 to Nuns, 4,531,037 to Camus, 4,775,772 to Chaboseau, 4,810,843 to Wicker, and 3,727,982 to Itoh. While some of the systems disclosed in these references may be usable for heating can closures, they are not optimal. In particular, for example, they may be very large and bulky, may require water cooling, and may suffer from non-uniform heating when applied to can ends.

Metal can closures are typically conveyed into the heat-treating apparatus in either of two ways. They can be conveyed by a conveyor belt, in which case the closures lie flat on the belt with coating or compound side up, or they can be stacked within a track or cage, in abutting face-to-face contact with each other ("in-stick"). The former technique is exemplified in the Collins patent. In the latter technique the closures are pushed through the apparatus in a direction transverse to their faces. Heat treating of can ends being pushed through in-stick would require less floor space since many more can ends can be packed into a given length of track. The technique is not often used, however, because convection air currents cannot heat the faces of the can ends directly.

Sullivan U.S. Pat. No. 4,333,246 attempts to address this problem, but still within the confines of convective drying techniques. In Sullivan, the workpieces are pushed through a curvilinear path defined by a constant width trackwork, allowed to pivot on the portions of the workpieces in proximity to the shorter radiuses whereby fan-like separation of the portions in proximity to the longer radius occurs. Sullivan uses this trackwork to partially separate can lids as heated air is directed toward the separated portions.

The Sullivan technique has a number of major disadvantages. First, though one portion of each of the workpieces is separated from the other workpieces, there is always another portion of the workpieces (the portions in proximity to the shorter radiuses) which are touching other workpieces. The pieces are only fanned, not truly separated. Thus, if the apparatus is being used to cure liquids applied selectively on can lids, for example, it can be used only where the selectively applied liquid has been applied somewhere other than around the circumference where the lids are likely to touch each other. Additionally, the pressure on the portions of the lids which do touch each other, caused by the forces pushing the lids along the track, can soften and/or damage the metal of the lids or their coating. Moreover, the Sullivan apparatus can generate only limited separation between the fanned portions of the can lids, since greater separation requires tighter curves in the trackwork, which in turn requires greater force and stronger materials in the equipment which pushes the lids along the track. Nor can the technique be used for long conveyance paths, for the same reason, even if the curves are kept shallow. Still further, Sullivan's technique will not work well with can lids which have pull rings, since these can lids do not nest well and are likely to scratch each other if they touch.

Whether can ends are transported flat or in-stick, the conveyance velocity and the length of the drying apparatus are chosen to ensure that a sufficient amount of the water or solvent in the applied liquid has been driven out by the time each can closure emerges from the apparatus. A problem arises, however, if the production line should stop for some reason or somehow become blocked. In this case, the can closures in the heating apparatus would remain there longer than originally intended, thereby overheating them and potentially destroying them. Closed-loop mechanisms have been provided in the past for handling this situation, but these mechanisms have only monitored air temperature in the furnace. No closed loop mechanism has monitored the temperature of the can closures themselves. Furthermore, for IR systems and high-temperature convection systems, where mechanisms were provided it was difficult to stop the heating process quickly enough to avoid damage. Lower temperature convection heating systems do exist which avoid the risk of overheating can lids simply because they never get hot enough to cause damage, but the lower temperatures undesirably also necessitate longer drying times and longer conveyance paths.

SUMMARY OF THE INVENTION

Accordingly, it is an object of the present invention to provide can body and can closure heating apparatus which overcomes some or all of the above disadvantages.

According to the invention, roughly stated, metal can closures are heated inductively by placing them in a medium frequency, oscillating magnetic field generated by a many-turn induction coil wrapped partly or entirely around the can closures. By using a medium frequency field, eddy currents are generated deep within the can ends to create a reservoir of thermal energy which heats the entire workpiece more uniformly. No focusing cores are required, and the conductors can be convection cooled. Can ends may also be fed through the apparatus in-stick. Moreover, the reduced current flow also permits the use of less expensive, convection cooled switches in the H-bridge of the inverter.

In another aspect of the invention, a control system for the switches in an inverter for an inductive heating system is provided which minimizes peak current flow through the switches and thereby obviates the need for a series inductor conventionally used for current limiting. The control system monitors the tank voltage phase angle and turns the switches on and off in optimal response thereto.

In another aspect of the invention, disc-like articles are separated magnetically while being motivated by sequentially switched electromagnets.

In another aspect of the invention, can bodies are rotated by a split conveyor belt while being transported through inductive heating apparatus.

In yet another aspect of the invention, closed-loop temperature control of the can closures is provided by apparatus which senses the temperature of the can lids themselves and turns off the heating means if the temperature exceeds a predetermined threshold.

BRIEF DESCRIPTION OF THE DRAWINGS

The invention will be described with respect to particular embodiments thereof, and reference will be made to the drawings, in which.

DETAILED DESCRIPTION

Figure 2:
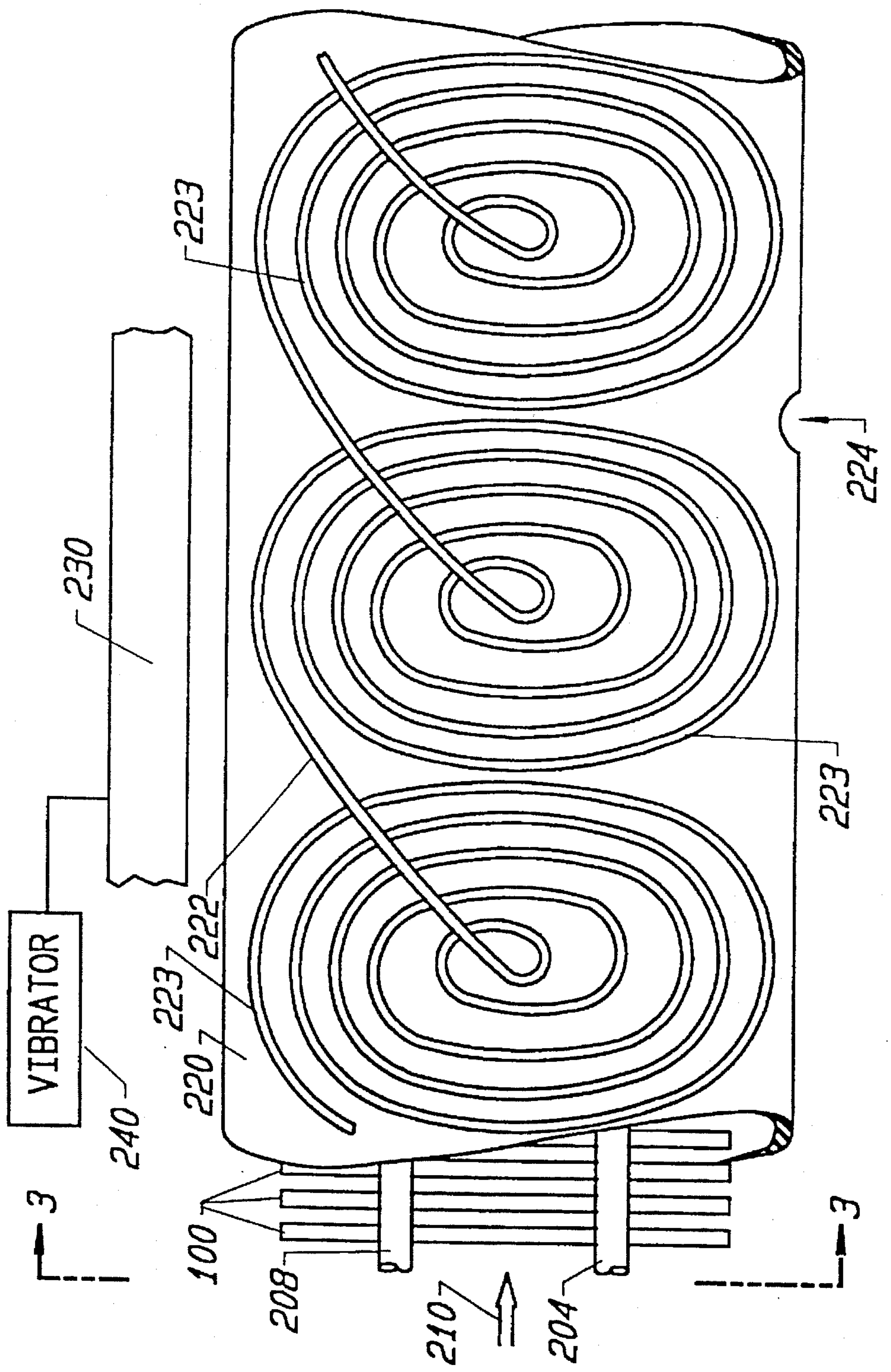
FIGS. 2 and 3 are a side view and a cross-section, respectively, of an embodiment of the invention.
Figure 3:
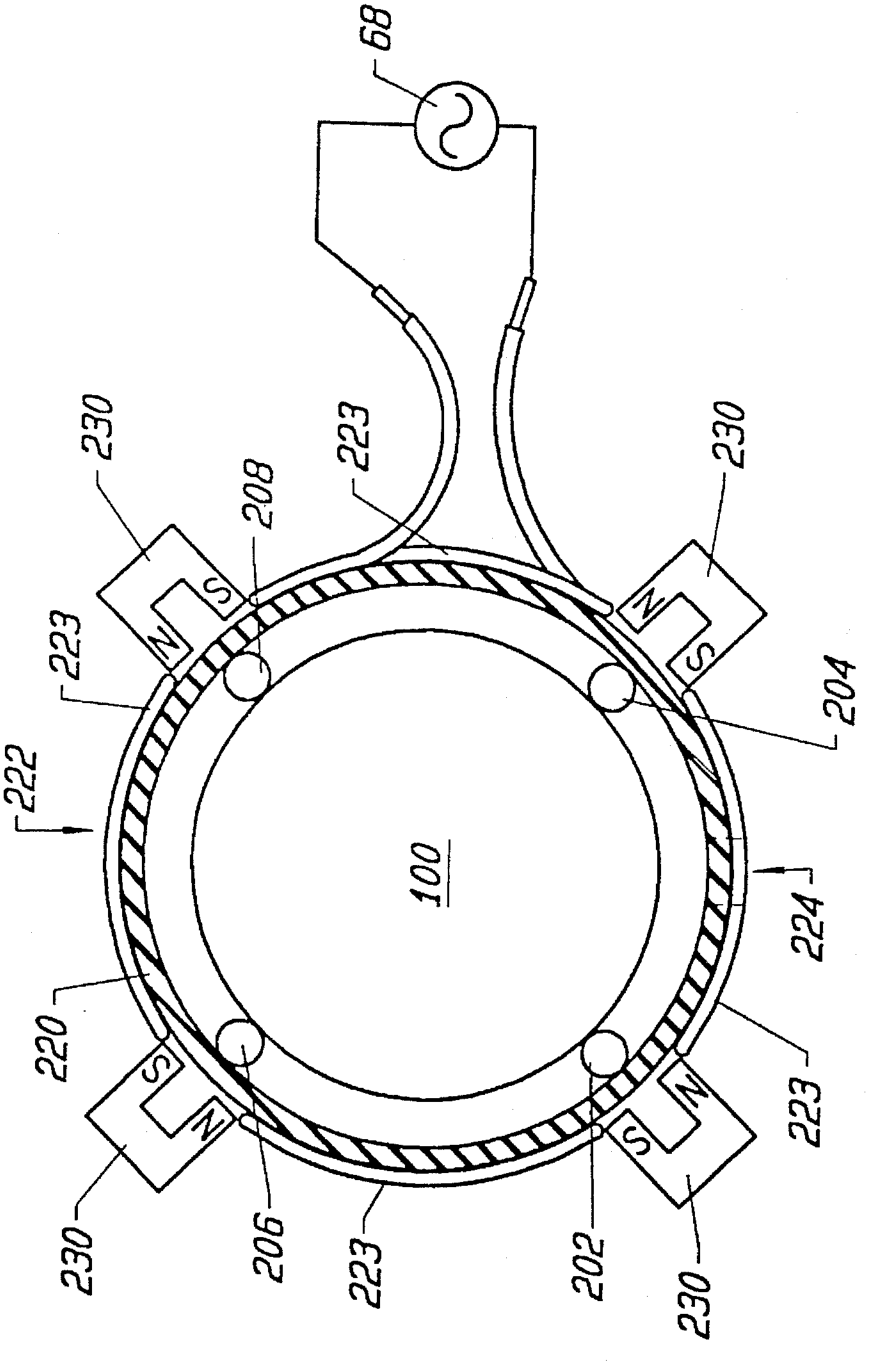

FIG. 2 shows a side view, partially cut away, of inductive heating apparatus according to the invention, for heating steel (or other ferromagnetic, electrically conductive) lids 100. FIG. 3 shows a cross-section of the same apparatus. The can closures 100 rest end-wise on a pair of guide rods 202 and 204, and two more guide rods 206 and 208 are provided to help hold the closures in place. The four guide rods 202, 204, 206 and 208 together define a conveyance path 210 for the column of closures 100. The guide rods 202,204, 206 and 208 are oriented axially at different circumferential positions along the inside surface of a guide tube 220. Both the guide rods and the guide tube are made of non-electrically-conductive material such as ceramic or teflon. The tube 220 preferably should also be thermally insulating, for reasons which will become apparent below. Guide rods 202, 204, 206 and 208 can be omitted in some embodiments, their function being replaced by the tube 220 itself.

Wrapped around the outside surface of the guide tube 220 is an inductive pancake coil 222 which is connected to an AC current source 68. The wiring 222 comprises four parallel regions of spirals 223, each region subtending a little less than one quarter arc on the circumference of the tube 220 and extending along substantially the entire length of the tube 220 within which heating is desired. The individual spirals 223 form pancake "subcoils", and partially enclose the conveyance path 210 around the circumference of tube 220. As used herein, a coil wraps partly around a conveyance path when it is not merely flat on one side of the conveyance path, but rather either curves partly around it or, if flat, has portions disposed on more than one side of the conveyance path. The coil wiring is air-cooled, not water-cooled, and advantageously may be multi-filar litz wire. Litz wire has multiple thin, solid-core strands, individually insulated, and is useful for reducing heat losses due to the skin effects when used at high frequencies. The wiring 222 can also be provided as a series of axially adjacent wiring sections if desired for modularity or other purposes. The spirals 223 are wound with a high turn density, for example 45 turns of the multi-filar wire, in order to generate a strong magnetic field with minimum current flow.

It should be noted that instead of spirals 223, the wiring 222 can be provided as a single, many-turn coil wrapping the tube 220. The magnetic forces induced by this arrangement, however, tend to rotate the can lids about a diameter, making it difficult to keep their faces oriented transversely to the direction of the conveyance path. Also, such an arrangement tends to heat the permanent separator magnets, discussed below, undesirably. A work coil wrapped entirely around the workpiece is therefore best used where can lids are being fed in-stick, as described below with respect to FIGS. 8 and 9.

The tube 220 has holes such as 224 at various positions along its length for ventilation of the can lids inside. Air can be circulated through these holes to provide for moisture scrubbing, cooling or otherwise treating. The spirals 223 are wound to avoid these holes 224. This affects the AC magnetic induction field inside the tube at that point, but the overall heating process is not significantly affected since the wiring still extends substantially the entire length of the tube 220 which is being used for inductive heating.

The AC current source 68 oscillates at a medium frequency of about 6–18 kHz, in response to the resonant frequency of the tank circuit with load. This generates AC electrical eddy currents also oscillating at the same frequency, in the metal can closures 100 as they move along the conveyance path 210. Medium frequencies are used in order to heat the closures deeply, to thereby create a reservoir of thermal energy which will heat the closures more uniformly. As is well known, lower frequencies will induce currents deep into the can closure, whereas the currents induced at higher frequencies are more shallow. Optimally, the AC current source 68 is intelligent enough to follow variations in the resonant frequency of the tank circuit by several kilohertz in each direction in order to optimize the energy transfer efficiency for can closures 100 of different available sizes, shapes, material content, and position relative to the coil 222.

It is well known that a plurality of magnetic objects free to move within a magnetic field, will spread out to share the entire available magnetic field equally. A can lid preheater is available from W. R. Grace & Co. which uses this technique to space lids vertically in face-to-face relationship with each other while hot air is circulated around the lids. Lids enter this apparatus at the top of a vertical column and are removed at the bottom. Permanent magnets oriented vertically adjacent to the column space the lids, counteracting their gravitational tendency to fall to the bottom and stack together. However, because of the high temperatures involved, the permanent magnets must be made of expensive magnetic materials with very high curie temperatures. Additionally, the technique has not been used on lids being transported in face-to-face relationship horizontally, or substantially horizontally, since the lids would bind up due to friction with the trackwork or other apparatus which supports them. The concept can be used, however, in apparatus according to the present invention.

Accordingly, located within the gaps between the four regions of spirals 223, and oriented longitudinally along the length of the tube 220, are a plurality of permanent rail or channel magnets 230. Only one of the rail magnets 230 is shown in FIG. 2, for illustrative simplicity. The permanent magnets 230 are oriented to provide alternating magnetic north and south poles around the circumference of the tube 220. Four permanent magnets 230 are shown in FIG. 3, but any number may be used. Also, the permanent magnets 230 may each run the length of the tube, or they may be provided in axially adjacent segments for modularity or other purposes. The apparatus of FIGS. 2 and 3 further includes a vibrator 240 (shown only in FIG. 3), which mechanically vibrates the permanent magnets 230 axially.

In operation, when a particular number of can lids 100 are inside the tube, they will try to equally share the magnetic fields generated by the permanent magnets 230 along the length of the tube. Friction is overcome by the mechanical vibrator 240, which vibrates the magnets 230, and therefore the magnetic fields generated by them, axially. The vibration frequency may be on the order of 60 Hz, and the wavelength should be shorter than the spacing between the lids. Vibration can be achieved instead by other methods, such as by mounting the guide rods 202, 204, 206 and 208 on flexures and vibrating them axially, or by using the force oscillations inherent in the reversing field of the coil 222. Another alternative would be to wrap a coil (not shown) around the tube 220 to provide a more slowly oscillating magnetic field specifically for vibrating the can lids 100. Vibrations would also be effective if transverse to the direction of travel.

With the can lids inside the tube 220, and spaced apart by the magnetic fields generated by the permanent magnets 230, a medium frequency AC current is provided to the wiring 222. A medium frequency AC magnetic field is thereby generated in each of the can lids inside the tube 220, which generates eddy currents to heat and dry them.

It can be seen that though high temperatures are induced in the can lids 100 themselves, the wiring 222 remains cool. Water cooling of a few-turn induction coil is not necessary. Also, since high temperatures are generally restricted to the lids 100 themselves, and since the permanent magnets 230 are substantially outside the fields generated by the spirals 223, the permanent magnets 230 may be inexpensive air cooled ceramic magnets instead of expensive magnets made of a high-curie-temperature material. It should also be noted that though permanent magnets 230 are shown in FIGS. 2 and 3, AC or DC electromagnets may be used instead to accomplish spacing.

As long as no other forces are applied, the can lids 100 in the tube 220 will simply space out to share the field generated by the permanent magnets 230. A motivating force or motivating means further may be provided to move the lids longitudinally along the path of travel 210. One way to apply such a force would be to tilt the tube such that the entrance end is higher than the exit end. This method uses gravity to skew the distribution of can lids along the length of the tube, so that they are spaced more closely together as they move toward the exit. When the lids reach some maximum packing density at the exit, the magnetic fields generated by the permanent magnets 230 will no longer be strong enough to overcome the gravitational tendency of the lid which is closest to the exit to fall out of the tube. Accordingly, for a given number of can lids desired in the tube at once, and for given magnetic field strengths generated by the spacer magnets, a tilt angle can be determined at which whenever one lid is added at the entrance of the tube, another lid falls out the exit. Thus as long as a method of overcoming friction is provided, a continuous flow of lids through the induction dryer can be maintained.

Figure 4:
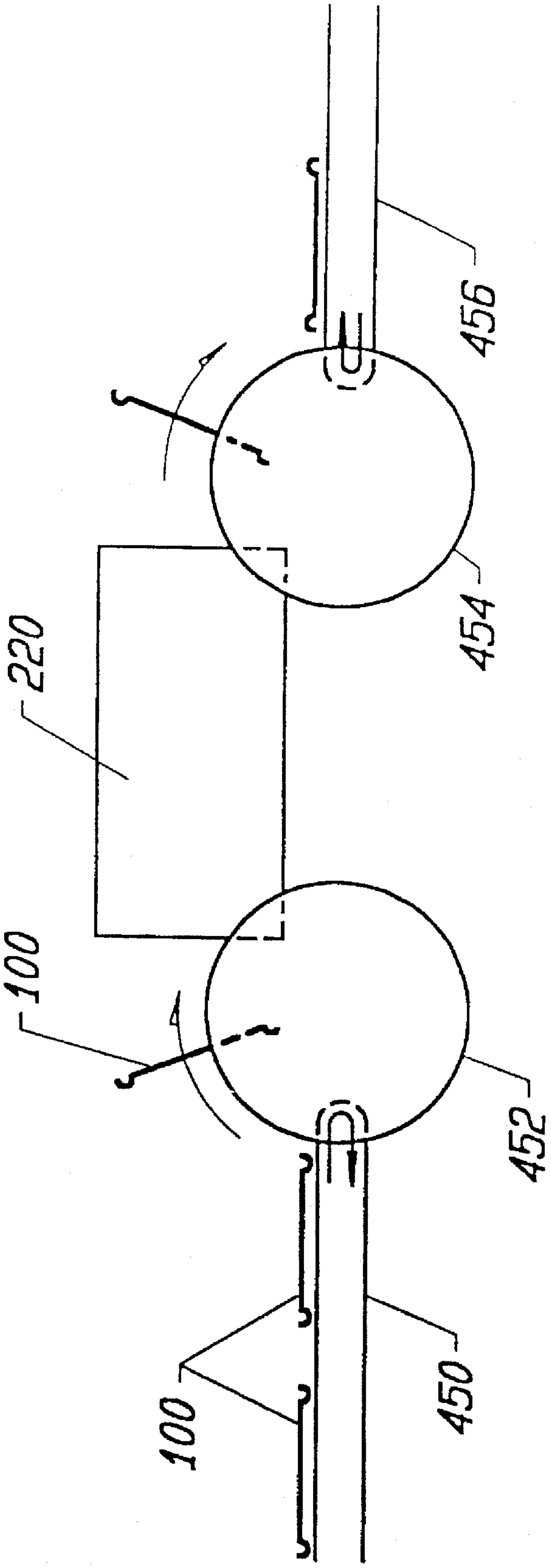
FIGS. 4 and 5 illustrate motivational techniques according to the invention.

The lids 100 can be motivated through the tube 220 also by other means, such as by mechanically removing a lid from the exit of the tube each time a new lid is added to the entrance. For example., FIG. 4 shows an upstream conveyor belt 450 transporting can lids 100 to a magnetic upstacker 452, which periodically adds a new can lid 100 to the entrance of the tube 220. Each time such a new can lid is added, a magnetic downstacker 454 removes the can lid then at the exit of the tube 220, and places it on a downstream conveyor belt 456 for further processing. Each time one lid is added to the entrance and another lid is removed from the exit, the remainder of the lids inside the tube automatically readjust their longitudinal positions to equally share the magnetic field generated by the permanent magnets 230 (not shown in FIG. 4). A rotating knife (not shown) may also be used instead of the downstacker 454 to remove individual can lids from the exit end of the tube 220.

Another method for motivating the can lids along the conveyance path 210 in the tube 220 is to cause them to move as if part of a linear induction motor. If the spirals 223 are connected in, for example, three phases, and three phases of the AC current source 68 are provided then assuming the spirals are properly spaced, a given one of the can lids 100 will be repeatedly attracted to the next downstream spiral and repelled from the previous spiral as the phases of the current source 68 rotate. The spirals 223 can be connected with a displacement of any desired number of turns.

Figure 5:
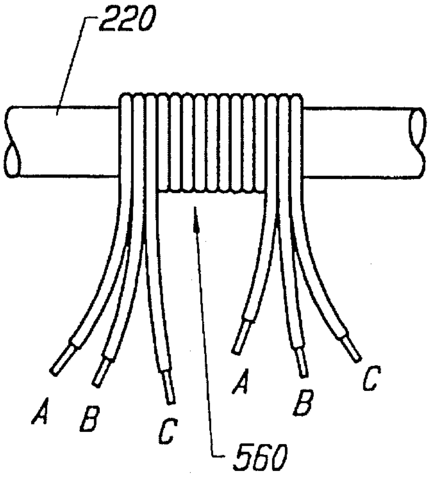

Alternatively, a motivating means can be provided by adding a separate poly-phase motivating coil, wrapped around the tube 220, for motivating the lids 100 along the conveyance path inside the tube 220. A three-phase (A,B,C) motivating coil 560 is shown in FIG. 5. The motivating coil 560 can operate at a lower frequency, for example 60 Hz. A separate motivating coil is disadvantageous in that it requires additional wiring, but it is advantageous in that the functions of heating and motivating are kept inductively independent. Thus the can lids may be kept moving by a separate motivating coil such as 560 even through a portion of the tube 220 within which inductive heating is not desired. Such a feature is useful in repair coat dryers, for example, in which can lids may be moved through an inductive heating portion of the tube, followed by a hot air soak portion of the tube, followed by a cool down portion of the same tube. In such a system, one portion of the tube might be wound with motivating coil 560, and only the inductive heating portion of the tube provided with the induction wiring 222.

A motivating coil preferably should not be used in the same portion of the tube 220 in which inductive heating will take place, since the magnetic fields generated by the inductive wiring may induce undesired currents in the motivating coil and vice versa.

Figure 6:
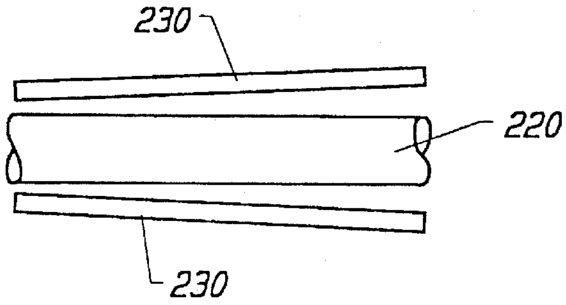
FIGS. 6 and 7 are side views of apparatus according to the invention, illustrating respective aspects. thereof.

Any of the above described motivation techniques can be aided, if desired, by strategic placement or orientation of the separator magnets 230. For example, in FIG. 6, two of the permanent magnets 230 are shown slanting away from the tube 220 toward the exit end thereof. This reduces the separating magnetic field within the tube at the exit end, and thereby permits the lids to space themselves more densely toward the exit end of the tube. This technique for controlling the density of the lids 100 at various points along the length of the tube 220 may be used as desired for any purpose. For example, the technique might be useful if it in any way simplifies the process of removing can lids from the exit end of the tube.

Figure 7:
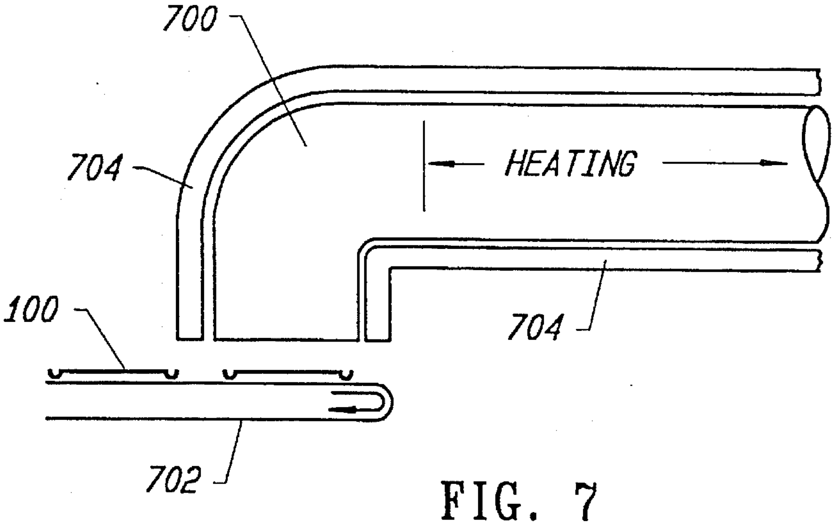

The invention permits significant flexibility in the design of can lid processing equipment. For example, since the permanent magnets 230 (FIGS. 2 and 3) do not need to have a high curie temperature, they can be made of a flexible material. This permits the use of a curved tube 220, such as that shown in FIG. 7. The tube 700 in FIG. 7, though mainly horizontal, curves 90° at the entrance to form a vertical uptake. The entrance of the tube 700 is disposed directly above a conveyor belt 702, which carries the can lids 100 into position. The can lids are individually attracted into the tube 700 by permanent magnets 704 (only two of which are shown in FIG. 7), which follow the curve of the tube 700. An inductive wiring such as 222 (FIGS. 2 and 3) may be provided on the tube 700, or on only a portion thereof as shown in FIG. 7. This technique effectively obviates any necessity for an upstacker. A similar curve at the exit of the tube 700 can obviate any need for a downstacker.

Aluminum can lids and bodies, since they are not ferromagnetic, probably cannot be magnetically spaced by spacer magnets such as 230 (FIGS. 2 and 3). However, since they do conduct eddy currents induced in them by wiring on the outside of the tube 220, aluminum can lids nevertheless are subject to induction heating by the wiring 222. The motivational features of the invention also apply to aluminum workpieces, since the eddy currents induced in the workpieces generate a magnetic field oriented repulsively to the magnetic field generated by the wiring 222. Thus the workpiece and the wiring 222 form a repulsive linear motor, propelling the workpiece longitudinally along the inside of the tube 220. Moreover, whereas for ferromagnetic workpieces, the magnetic attraction of the workpieces to the spirals 223 may be so strong as to counteract the magnetic repulsive forces generated, this is not true with aluminum can lids. Thus, aluminum workpieces will be repelled inwardly from all sides of the tube with substantial uniformity, forcing it into the middle of the tube and thereby minimizing friction as the workpiece is propelled longitudinally. This minimizes the need for a vibrator such as 240. Aluminum workpieces can also be propelled by a poly-phase linear propulsion motor formed with a poly-phase winding such as that shown as 560 (FIG. 5).

Figure 8:
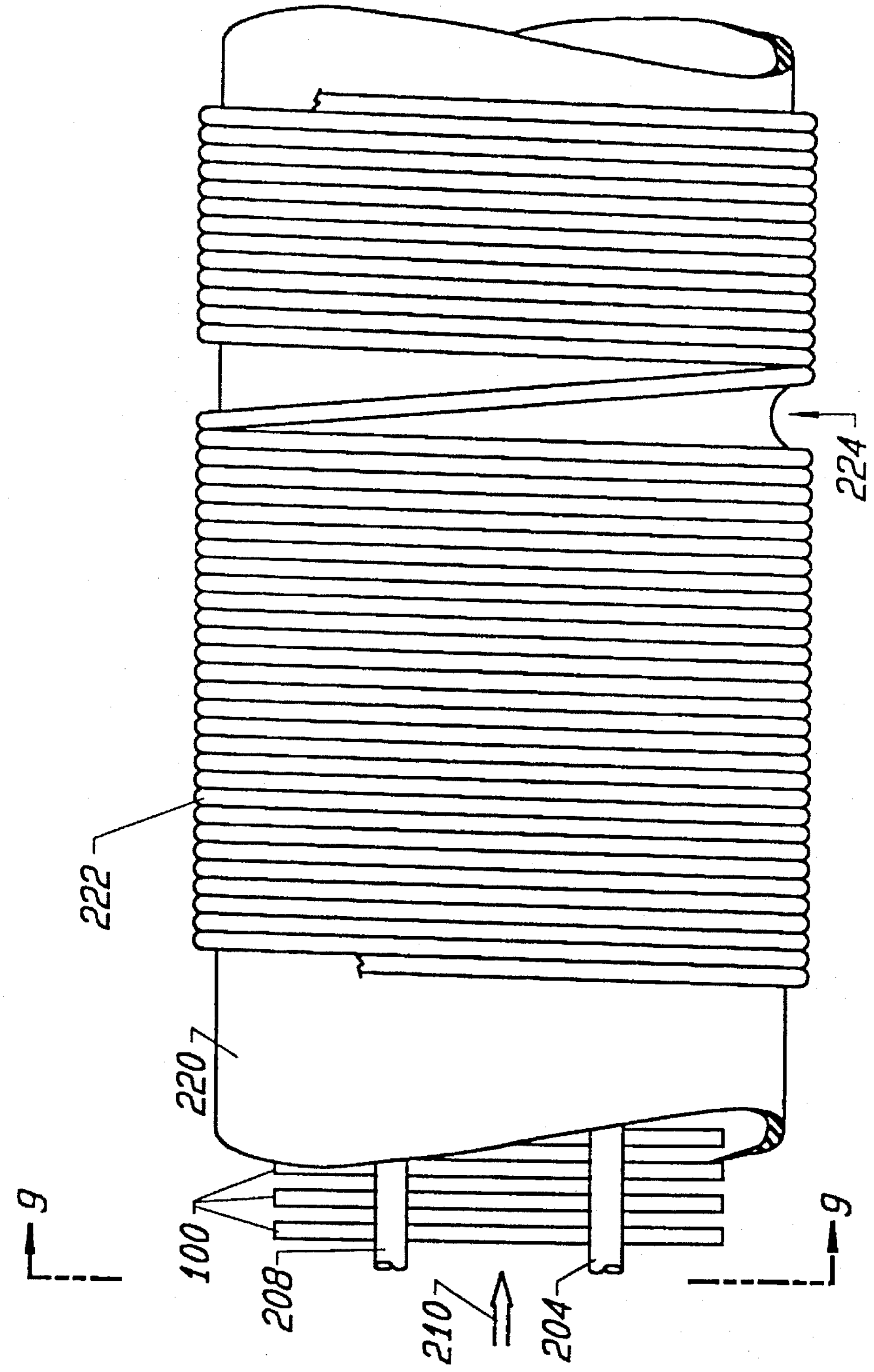
FIGS. 8 and 9 are a side view and a cross-section, respectively, of another embodiment of the invention.
Figure 9:
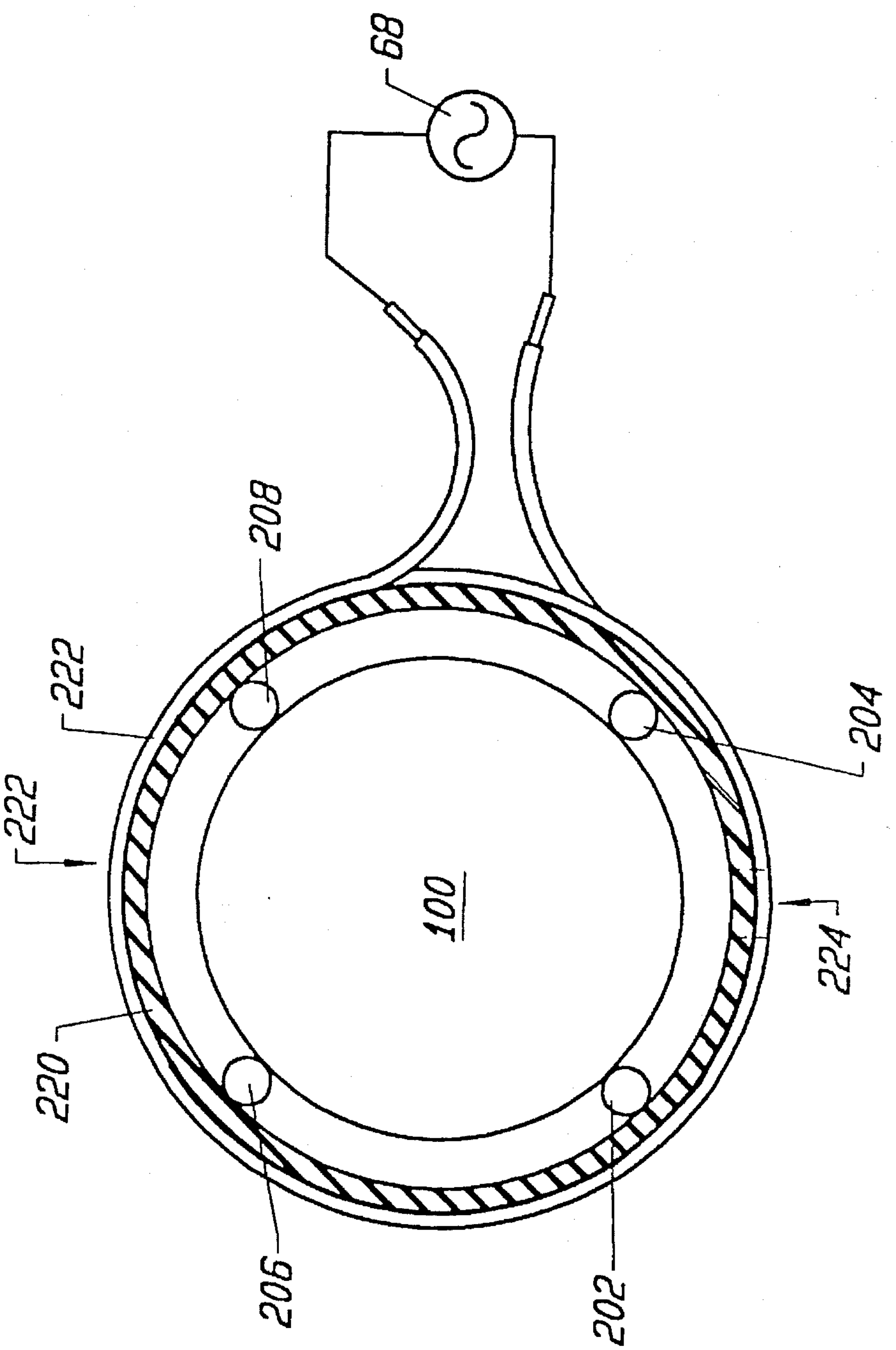

In FIGS. 8 and 9 there is shown an alternative embodiment for the inductive heating apparatus according to the invention, in which the can closures are stacked face-to-face and pushed in-stick through the heating apparatus in a direction transverse to the major surfaces of the closures. The apparatus is similar to that of FIGS. 2 and 3, except that no separator magnet 230 is included, and the work coil 222 is wrapped entirely around the tube 220 instead of only partially around as in FIG. 2.

FIG. 8 shows a side view of the apparatus, and FIG. 9 shows a projection taken along lines 9—9 shown in FIG. 8. In the apparatus, as in FIG. 2, each of the can closures 100 in a stick or column rests end-wise on a pair of guide rods 202 and 204. Two more guide rods 206 and 208 are provided to help hold the closures in place. The four guide rods 202, 204, 206 and 208 together define the conveyance path 210 for the stick of closures 100. The closures 100 abut each other and, if their shape permits it, are nested with each other. In this way, the entire stack of lids may be pushes along the conveyance path 210 by force from only the rear end of the stack.

In operation, can closures are treated with selective coatings and typically pushed onto the rear end of the stack by a magnetic wheel or other means (not shown). The act of pushing each new can closure onto the rear of the stack effectively pushed the entire stack forward by the width of one can closure. Hot closures are removed from the front of the stack at the same rate.

As the closures pass through the AC magnetic field generated by the coil 222, medium-frequency AC currents are generated in the closures, thereby heating them in much the same way as described above with respect to the apparatus of FIG. 2. As with the apparatus of FIGS. 2 and 3, an AC current source 68 is included with the apparatus of FIGS. 8 and 9 and the currents through the windings oscillate at approximately 6–18 KHz.

The coil 222 is actually wired using a pair of electrically and physically parallel windings of multi-filar litz wire. There are 55 "turns" of the parallel pair along a 22" length of the tube 220, for a turn density of 2.5 turns per longitudinal inch. For one size of can ends, the inside diameter of a turn is about 3.25". The coil current is distributed much more evenly across a cross-section of a turn than in prior art induction heating systems in large part because of the medium frequencies used in the present system. Since the current density at any point in the cross-section never becomes excessive, water cooling is not necessary and convection cooling can be used instead. At about 8.5 kHz, Less than 700 watts are dissipated in this coil for a tank current of about 300 amps RMS.

Figure 10:
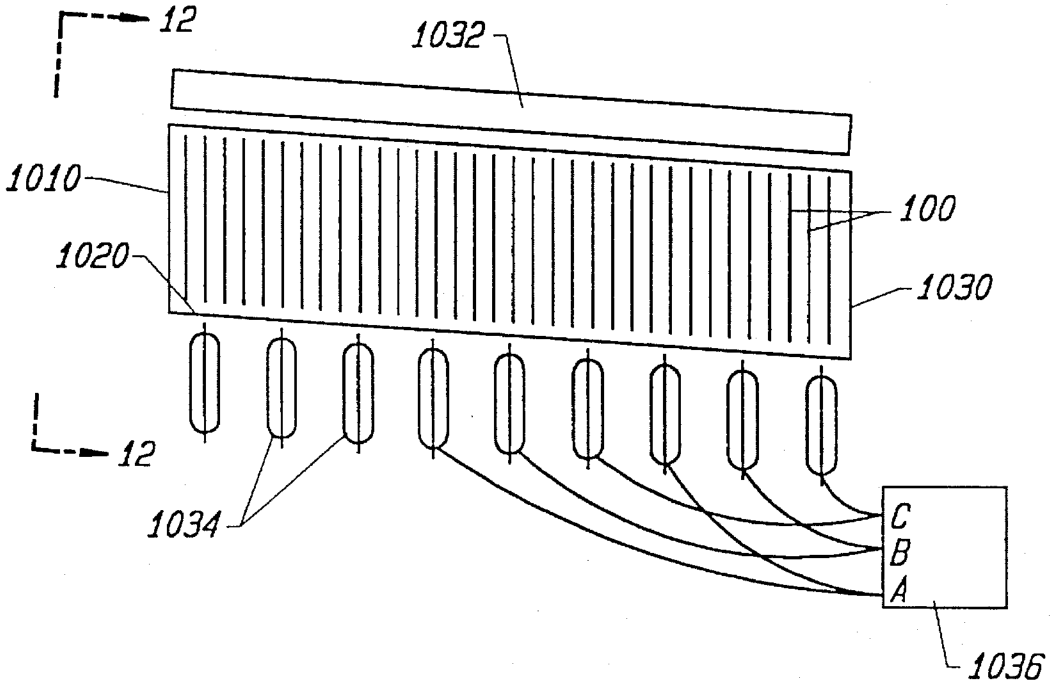
FIGS. 10 and 12 are a side view and a cross-section, respectively, of another embodiment of the invention.

FIG. 10 shows another embodiment of the present invention in which can lids are spaced apart magnetically, and motivated magnetically along a conveyance path, but no induction heating takes place. In the apparatus, can lids 100 (shown symbolically in FIG. 10) are fed in face-to-face orientation into an entrance 1010 of a tube 1020. The exit end 1030 of tube 1020, though not required, is shown slightly lower than the entrance end 1010 so that gravity may facilitate movement of the can lids from the entrance to the exit. The tube 1020 therefore maintains the can lids in a column and it defines a conveyance path. A permanent separator magnet 1032 is disposed longitudinally outside the top surface of the tube 1020, and a series of electromagnets or solenoids 1034 is disposed longitudinally outside and along the bottom surface of the tube 1020.

Figure 11:
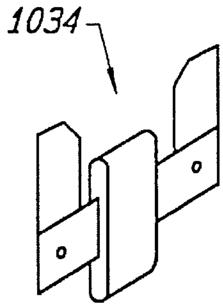
FIG. 11 is a perspective view of a solenoid shown in FIGS. 10 and 12.

FIG. 11 is a perspective view of one of the solenoids 1034. The solenoids are mounted by means not shown, in a manner that permits them to be individually adjusted to positions slightly upstream or downstream of those shown in FIG. 10 for calibration purposes.

Figure 12:
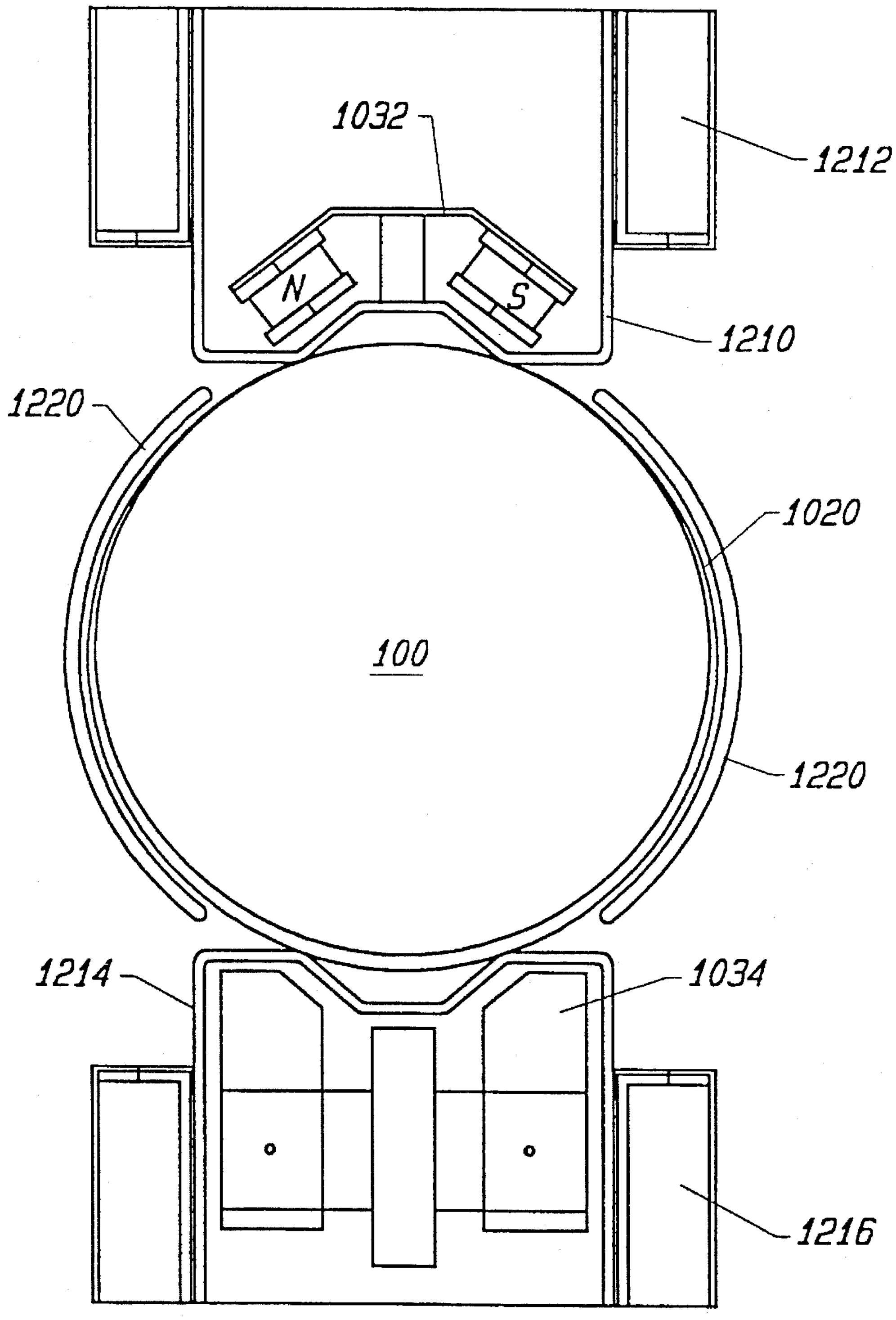
Figure 13:
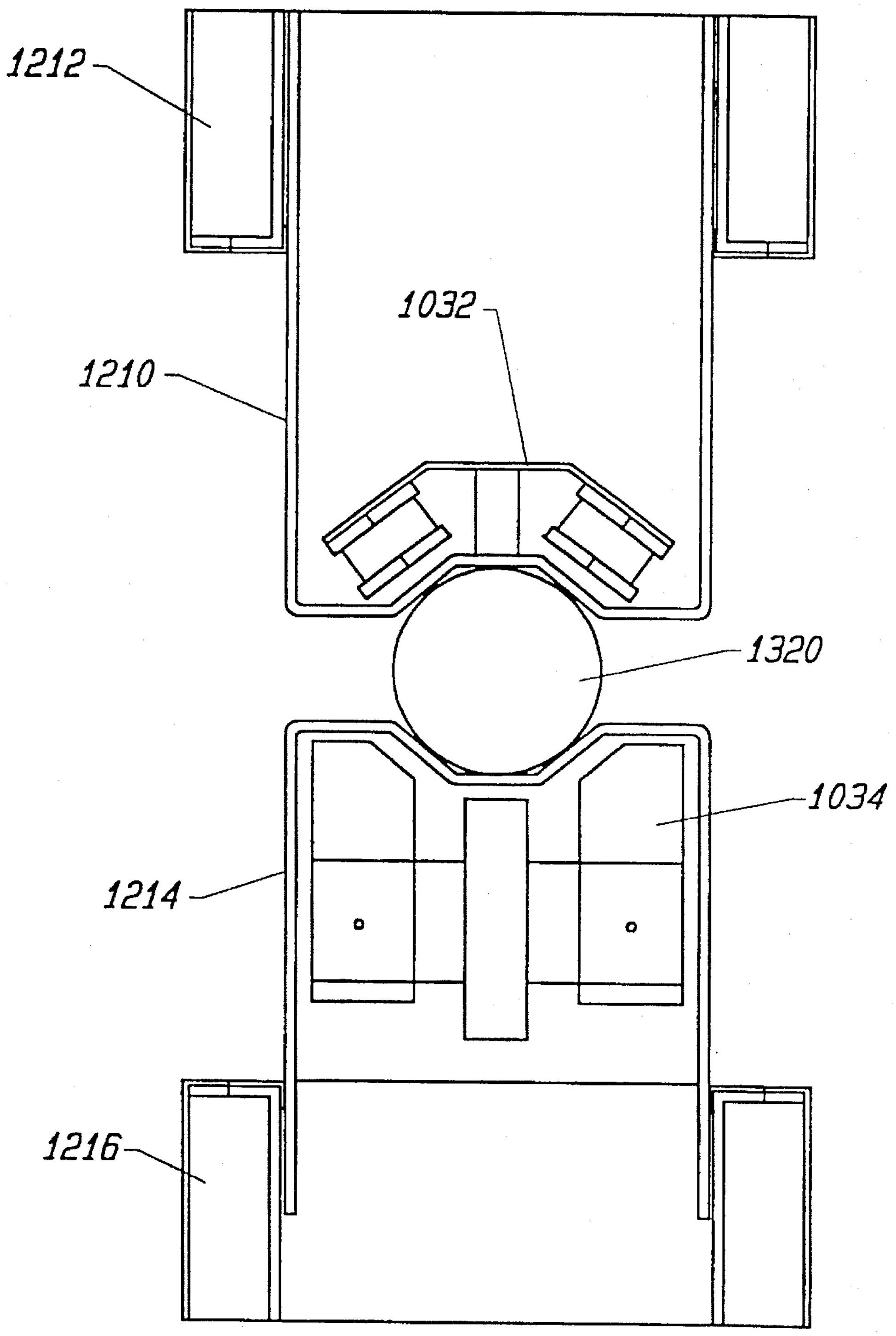
FIG. 13 is a cross-sectional view of the apparatus of FIGS. 10–12 for use with a smaller tube.

FIG. 12 shows an end view of the apparatus of FIG. 10, taken along arrows 12—12. In addition to one of the can lids 100, the permanent magnet 1032, the tube 1020 and one of the solenoids 1034, the view of FIG. 12 also shows the mounting of the permanent magnet 1032 and solenoids 1034. In particular, permanent magnet 1032 is attached to a frame 1210 which can slide up or down to different positions within a bracket 1212. Similarly, the solenoids 1034 are attached to a frame 1214 which can slide up or down to different positions within a bracket 1216. FIG. 13 shows how the adjustability of the frames 1210 and 1214 cooperate with the shape of such frames to accommodate a smaller diameter tube 1320 and, accordingly, small diameter can lids.

Returning to FIG. 10, a movement control circuit 1036 is also provided which has a poly-phase output, having at least three phases A, B and C. The movement control circuit 1036 generates three phases of pulse currents which drive the coils 1034 in a sequentially interleaved manner. Any number of phases and interleaf factors can be used, but at least three phases are required to define a direction of motion.

In operation, the permanent magnet 1032 attracts the can lids 100, which are ferromagnetic, so that their edges contact the inside top surface of tube 1020. The permanent magnet 1032 also has a separating effect as explained previously, but the lids 100 are for the most part prevented from moving axially if ends are introduced at the entrance and others removed at the exit, because of the frictional forces between the edges of the can lids 100 and the inside top surface of tube 1020. The solenoids 1034 act to attract the can lids away from the inside top surface of tube 1020 momentarily whenever a pulse from movement control circuit 1036 is applied to one of the solenoids 1034. This facilitates the magnetic spacing produced by permanent magnet 1032. Additionally, since the solenoids 1034 are energized in a poly-phase interleaved manner, the can lids 100 are gradually moved along the conveyance path toward the exit 1030. The pulse frequency of movement control circuit 1036 may be on the order of 20–250 Hz; generally, up to a point, the higher this frequency, the more quickly the can lids 100 will be motivated toward the exit 1030. Additionally, if it is desired to heat the can lids 100 inductively at the same time they are being motivated by the solenoids 1034, each of the pulses provided to the solenoids 1034 may comprise a medium frequency burst, rather than a simple square wave pulse. Alternatively or additionally, pancake coils such as those shown as 1220 only in FIG. 12, may be attached to the outside of tube 1020 on the two opposite sides thereof. This coil, which may be the same as those described above, wraps partially around the can lids 100 circumferentially, and may be energized with the same medium frequency current described above.

Figure 14:
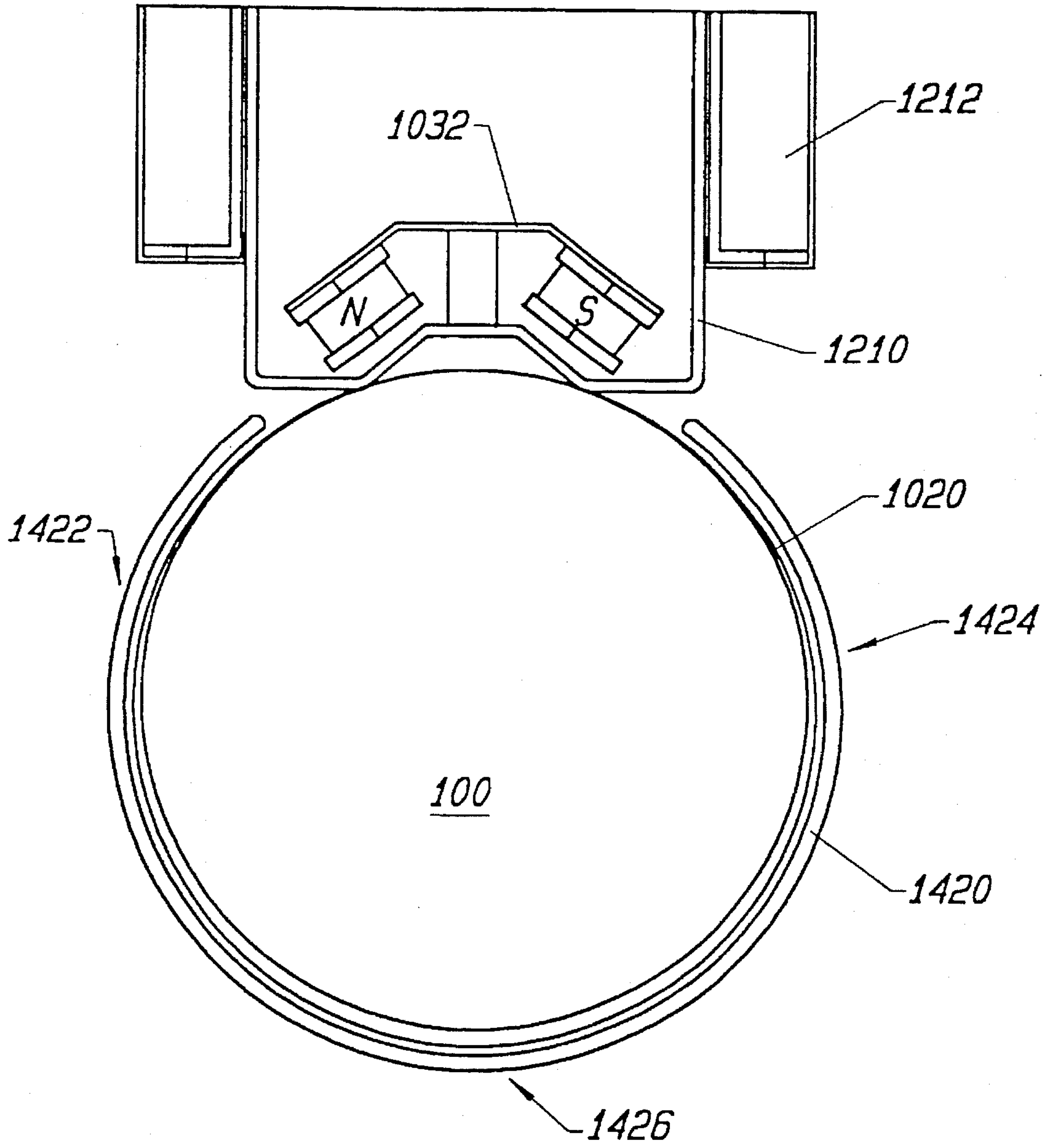
FIG. 14 is a cross-sectional view of a modification of the apparatus of FIGS. 10–12.

Yet another alternative is shown in FIG. 14, in which the solenoids 1034 are replaced by a pancake coil 1420 wrapped substantially completely around a circumference of the tube 1020. In particular, the pancake coil subtends the two opposite sides 1422 and 1424 and the bottom 1426 of the conveyance path. Coil 1420 may, if desired, be divided into a plurality of separately wound pancake sub-coils which are edge-adjacent around the circumference of the tube 1020. Also, different ones of these coils 1420 may be wrapped around longitudinally adjacent portions of the tube 1020 in the same interleaved manner as the solenoids 1034, and can be energized in poly-phase manner with medium-frequency pulse bursts. In this manner, pancake coils 1420 will draw the can lids 100 away from the inside top surface of tube 1020 to assist spacing, will motivate the lids toward the exit 1030, and will inductively heat the can lids at the same time.

Figure 15:
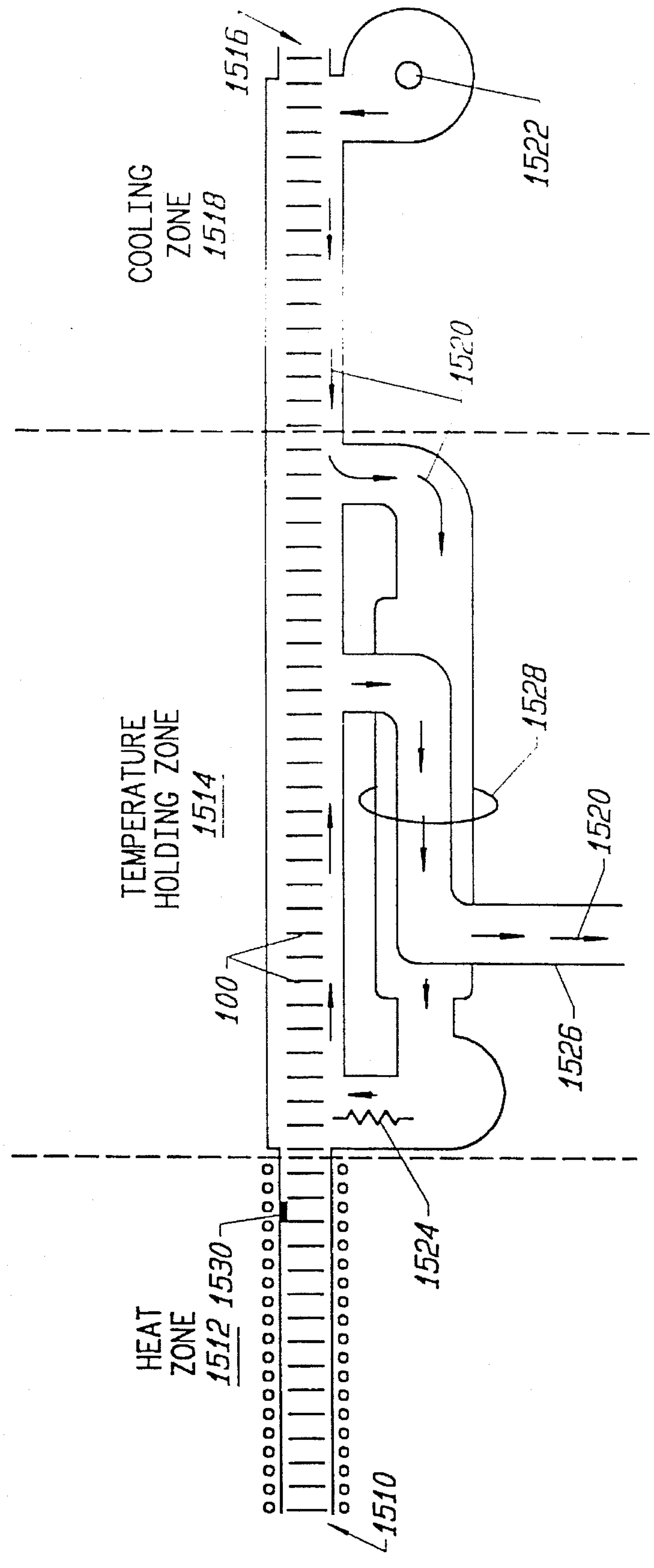
FIG. 15 is a side view of another embodiment of the invention.

FIG. 15 shows an overall system for drying liquids applied to can lids 100. The lids are pushed into an entrance 1510 of a heating zone 1512 which may, for example, be 32 inches long. In the heating zone 1512, the lids are inductively heated in-stick, using the principles set forth above with respect to FIGS. 8 and 9. The heating zone 1512 also may include an IR sensor 1530, explained below.

The lids then enter a temperature holding zone 1514, in which they are spaced apart magnetically and motivated magnetically toward an exit 1516 of the apparatus, both using the principles described above with respect to FIGS. 10, 11 and 12. The lids are not heated inductively in the temperature holding zone 1514, but instead air is circulated between them in a manner hereinafter described. However, since the inductive heating which took place while the lids were in the heating zone 1512 was accomplished at medium frequency, creating a reservoir of thermal energy throughout the can lids, the lids are still hot as they enter the temperature holding zone 1514 and help to keep the temperature high in the temperature holding zone 1514. The temperature holding zone 1514 may, for example, be 48 inches long.

As the lids leave the temperature holding zone 1514, they enter a cooling zone 1518 which, like the temperature holding zone 1514, separates the lids magnetically and motivates them magnetically toward the exit 1516 using the principles described with respect to FIGS. 10, 11 and 12.

Arrows 1520 show the direction of air flow in the apparatus of FIG. 15. A blower 1522 blows room temperature air into the tube in the cooling zone 1518 from near the exit 1516. The air travels toward the temperature holding zone 1514, and as it does so, it simultaneously cools the lids in the cooling zone 1518 and picks up heat for use in the temperature holding zone 1514. Upon entering the temperature holding zone 1514, the air is directed through the tube containing the can lids into a heat exchanger 1528, heated by a resistive heater 1524, and supplied back to the temperature holding zone 1514 near the entrance of that zone. The hot air then flows through the tube containing the can lids in the temperature holding zone 1514 in the same direction that the lids are moving, where it scrubs off evolved moisture from the can lids. The air then flows out an exhaust pipe 1526 from a point near the downstream end of the temperature holding zone 1514. The heat exchanger 1528 may be provided to couple heat from the exhaust pipe 1526 into the air flowing to the resistive heater 1524 in order to help conserve energy.

As mentioned previously, a problem with prior-art can-closure drying apparatus has been their tendency to overheat and damage can closures which are inside the heater when the production line becomes blocked or stops for some reason. Even if a means were to be provided to turn off the heater when the line stops, heating can nevertheless continue for an undesirably long period of time.

In accordance with an aspect of the invention, closed-loop temperature control is provided which monitors the temperature of the can lids 100 directly. In particular, as shown in FIG. 15, a temperature sensor 1530, which may be a conventional IR sensor, is provided adjacent the conveyance path in the heating zone 1512 to sense the temperature of the closures 100. Should the temperature of the closures 100 be higher than a predetermined temperature, the IR sensor quickly senses this condition and the AC current source (not shown in FIG. 15) is automatically turned off. This stops all current flow through the can closures, thereby almost immediately preventing the closures from becoming any hotter. The quick response of the IR sensor sensing the lids themselves, rather than the surrounding air, combines with the quick turn-off capability of an induction heater, to promptly prevent further heating.

Temperature sensing of the lids can also be used as part of closed-loop temperature control for the ordinary operation of the inductive heater, even absent failures such as line stoppage. For example, it is known that a particular water-based sealant placed in the curl of a lid has been sufficiently heated to reach 98% solids within 10 minutes when the lid 100 has reached a temperature of 150°–220° F. A closed-loop temperature-sensing system monitoring the temperature of the lids 100 directly can therefore be incorporated in an induction dryer to turn off the AC current source when each closure reaches that threshold temperature. In this way closures of different size, thickness, position or orientation can be accommodated, without changing the construction of the induction drying portion of the production line.

Figure 22:
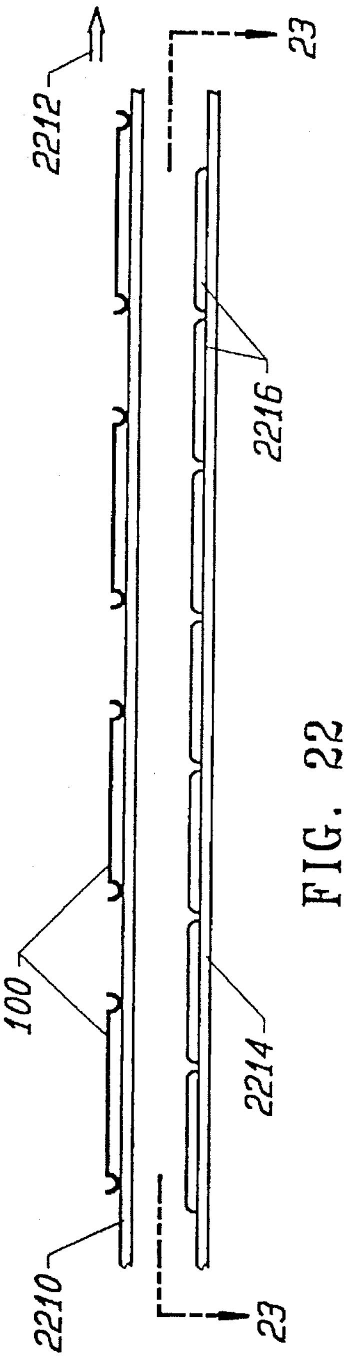
FIGS. 22 and 23 are a side view and a cross-section, respectively, of another embodiment of the invention.
Figure 23:
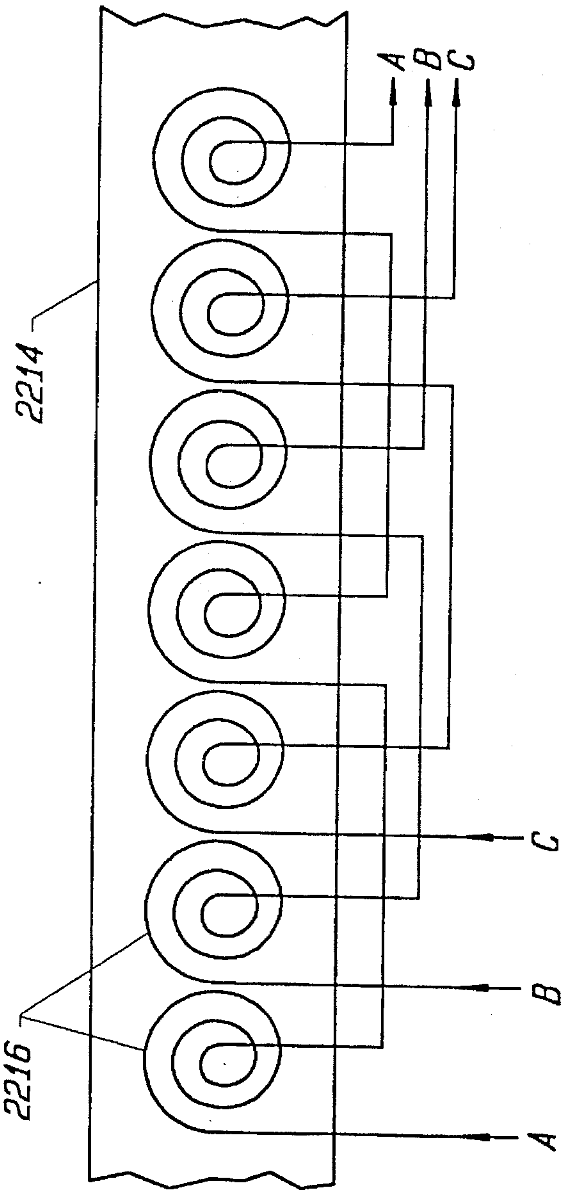

The invention has been illustrated so far mainly with embodiments in which can lids are provided in face-to-face relationship. FIGS. 22 and 23 show an example of apparatus in which the invention may be used with can lids provided lying flat on a platform. FIG. 22 is a side view of the apparatus and FIG. 23 is a cross-section taken along lines 23—23 of FIG. 22. The apparatus comprises a platform 2210, on which the can ends 100 slide along a conveyance path and in a direction indicated by arrow 2212. Mounted below the platform 2210 is a support 2214 having coils 2216 on its top surface. The coils 2216 are spiral windings facing, and arranged sequentially along, the conveyance path 2212. The spirals 2216 are interconnected in a poly-phase manner, in particular, every third spiral being connected together.

Three phases of the AC current source (not shown in FIGS. 22 and 23) are connected respectively to the three phases A, B and C of the spirals. As with other embodiments previously described, the embodiment of FIGS. 22 and 23 will generate high frequency oscillating eddy currents in the metal can closures 100 as they move along the conveyance path 2212. The use of poly-phase spirals as shown in FIGS. 22 and 23 is appropriate to provide motivational forces as explained in more detail elsewhere; a single phase arrangement is all that is necessary if motivation is provided by some other means, such as a moving conveyor belt.

Figure 16:
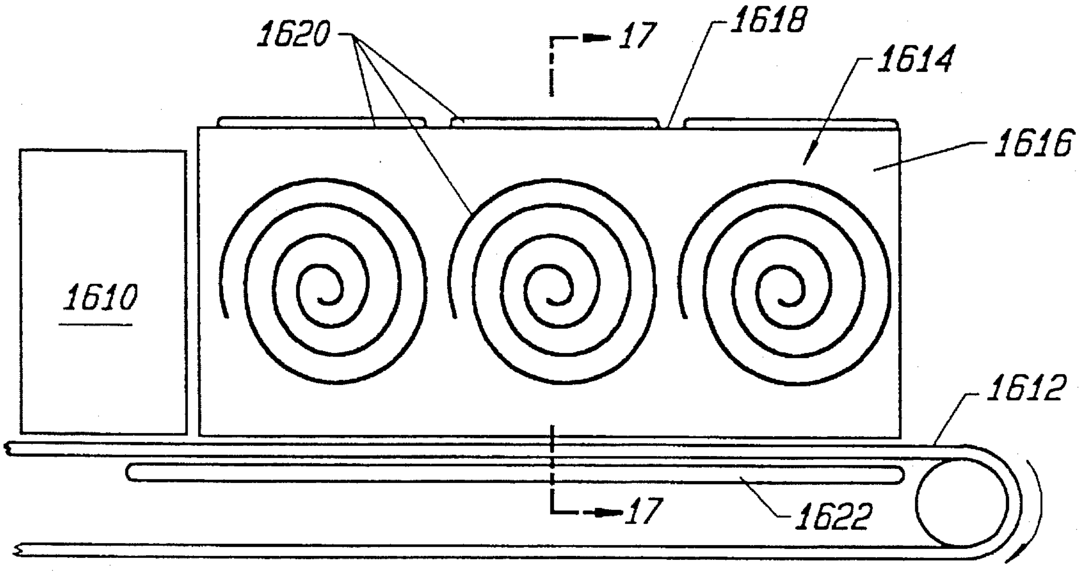
FIGS. 16 and 17 are a side view and a cross-section, respectively, of an embodiment of the invention for heating can bodies.
Figure 17:
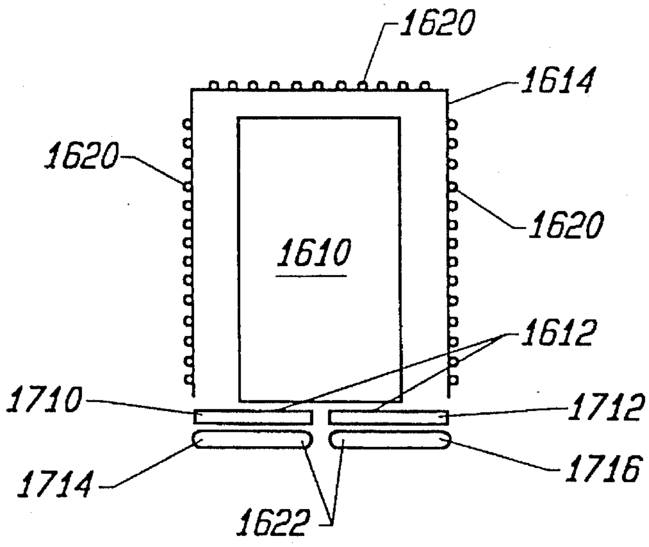

FIGS. 16 and 17 show how the invention may be used to heat can bodies. FIG. 16 is a side view of the apparatus, and FIG. 17 is a cross-sectional view taken along arrows 17—17. Referring to FIG. 16, a series of can bodies 1610 are transported on a conveyor belt 1612 into a tunnel 1614 having two opposite sides (only one of which, 1616, is visible in the view of FIG. 16). The tunnel 1614 also has a top 1618. Pancake coils 1620 are wrapped on the two opposite sides and the top of tunnel 1614, and therefor wrap partly around the conveyance path of the can bodies 1610. The spirals may be connected together in series or parallel or both. The apparatus also includes a holding means shown symbolically as 1622, the purpose for which is explained below.

As shown in FIG. 17, the conveyor belt 1612 is in actuality split longitudinally into two portions 1710 and 1712. The holding means 1622 may also be split longitudinally into portions 1714 and 1716. The holding means 1622 attracts the can bodies 1610 to make frictional contact with both portions 1710 and 1712 of the conveyor belt 1612. The holding means may be vacuum-based, or if the can bodies 1610 are at least partly ferromagnetic, the holding means may be permanent or electromagnets. The two portions 1710 and 1712 of the conveyor belt 1612 travel at different speeds thereby causing the can bodies to rotate as they pass through the tunnel 1614. This achieves more even heating.

Figure 18:
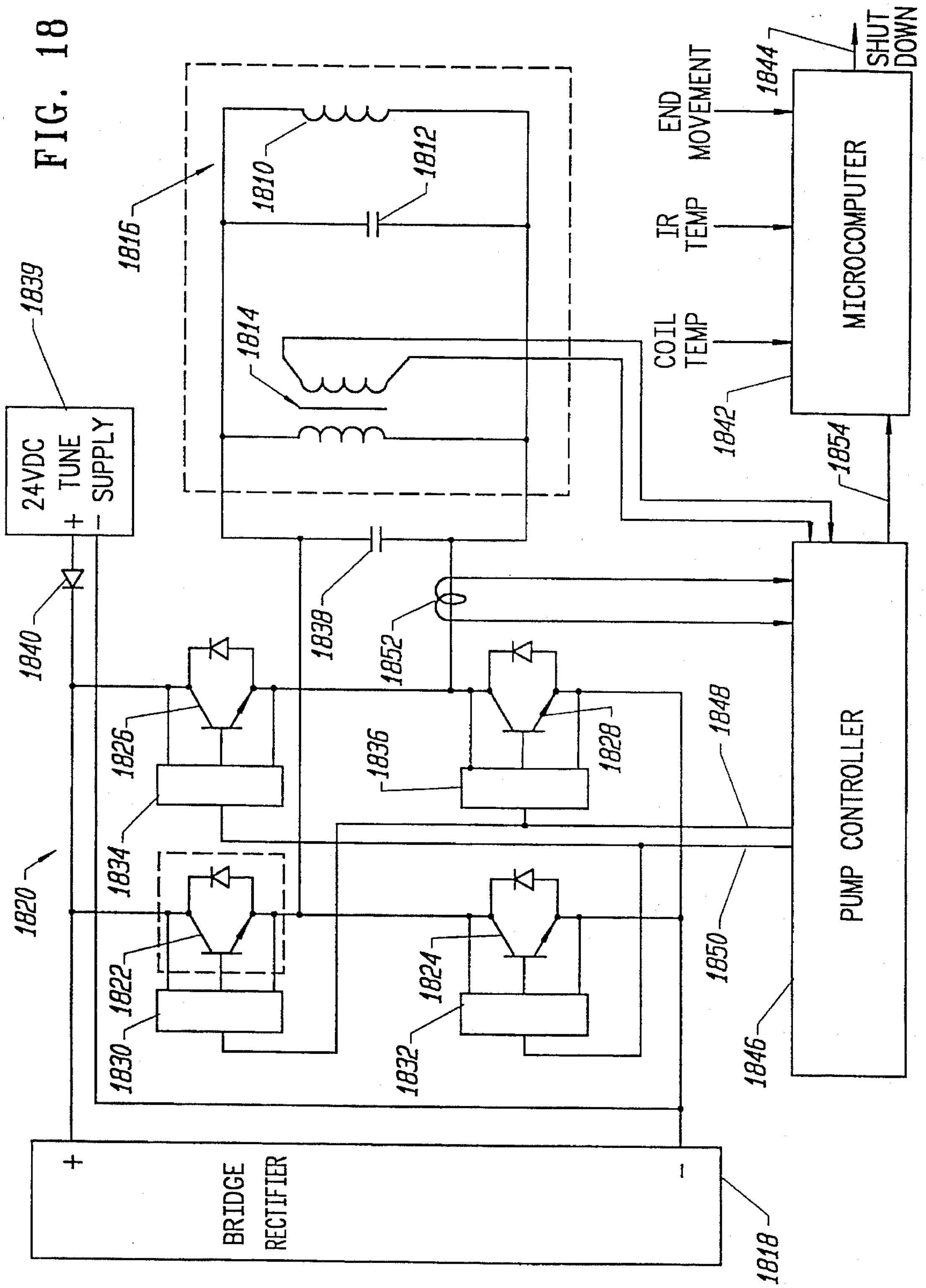
FIGS. 18, 19 and 21 diagram electrical circuitry for operating inductive heating apparatus according to the invention.

FIG. 18 depicts major portions of electronic circuitry to drive the coils described above. In FIG. 18, a tank circuit 1816 comprises a work coil 1810 and a parallel capacitor 1812. Capacitor 1812 is chosen so that the tank circuit, when used with a typical workpiece in place, will have a resonant frequency on the order of 6–18 kHz. The capacitor 1812 is located physically close to the work coil 1810. Also located near the work coil 1810 is a voltage pickoff transformer 1814, the primary of which is connected across the work coil 1810. When used, the tank circuit of FIG. 18 may, for example, have a 400-volt RMS voltage thereacross.

The tank circuit 1816 is driven by pump circuitry which includes a three-phase bridge rectifier 1818 coupled to an H-bridge 1820. The H-bridge 1820 includes four NPN IGBTs 1822, 1824, 1826 and 1828, driven by respective IGBT drivers 1830, 1832, 1834 and 1836. Each of the IGBTs 1822, 1824, 1826 and 1828 has a respective diode having an anode connected to the emitter of the IGBT and a cathode connected to the collector of the IGBT. The IGBT/diode combination is available in a single package, for example, an MG400Q1US1 manufactured by Toshiba Electronics Europe GmbH, Irvine, Calif. The collector and emitter of an IGBT are sometimes referred to herein as the current path terminals of the IGBT, and the base is sometimes referred to herein as the control terminal. In the H-bridge 1820, the positive output of bridge rectifier 1818 is connected to the collectors of IGBTs 1822 and 1826, and the negative output of bridge rectifier 1818 is connected to the emitters of IGBTs 1824 and 1828. The emitter of IGBT 1822 is connected to the collector of IGBT 1824, and the emitter of IGBT 1826 is connected to the collector of IGBT 1828. A filter capacitor 1838 is connected across the H-bridge, that is, from the emitter of IGBT 1822 to the emitter of IGBT 1826. The two terminals of capacitor 1838 are also connected in parallel to the two terminals of the tank circuit 1816. A 24-volt DC tune power supply 1839 is also coupled to the collectors of IGBTs 1822 and 1826 via a diode 1840.

Overall control of the system is governed by a microcomputer 1842. Among many other tasks, the microcomputer 1842 receives sensor inputs from the induction heating furnace representing the temperature of the work coil 1810, an infrared (IR) temperature reading as described above with respect to FIG. 15, and an indication of whether the can ends are moving as expected. As will be seen, these sense inputs permit the microcomputer 1842 to shut down the apparatus in the event any malfunction occurs. The microcomputer 1842 generates a shutdown signal shown symbolically as a line 1844, which may operate, for example, a relay control of AC power to the bridge rectifier 1818 in conjunction with a crowbar circuit.

The apparatus of FIG. 18 also includes a pump controller 1846, which monitors and adjusts the pump current provided through the H-bridge 1820, pulse by pulse. In order to accomplish this, the pump controller 1846 receives as inputs the secondary of the voltage pickoff transformer 1814, and generates two control signals on lines 1848 and 1850 to control the IGBTs in the H-bridge 1820. In particular, control line 1848 is connected to the input of IGBT drivers 1830 and 1836, and the control line 1850 is connected to the input of IGBT drivers 1834 and 1832. Pump controller 1846 also directly monitors the pump current provided through the IGBTs and across the H-bridge 1820, via a current pickup coil 1852 connected to the pump controller 1846. The pump controller 1846 can provide a shutdown signal to the microcomputer 1842 over a line 1854.

When the apparatus of FIG. 18 is first started up, pump controller 1846 provides a signal over line 1854 to the microcomputer 1842 which temporarily keeps the main power supply of the hump circuit off. During this time, the pump circuit is fed by the 24-volt tune supply 1839. This permits the tank circuit 1816 to reach steady state oscillation before the main supply is turned on. After a predetermined period of time, for example 5–10 seconds, if everything seems to be working correctly, the pump controller 1846 indicates over the line 1854 to the microcomputer 1842 that the main supply can now be turned on. This automatically back biases diode 1840, essentially disconnecting the 24-volt tune supply 1839 from the system.

It will be seen that the pump controller 1846 monitors the voltage across the tank circuit 1816 via the pickoff transformer 1814, and activates the IGBTs of the H-bridge 1820 only at times optimally determined to minimize the peak currents which must flow through the IGBTs. The pump controller 1846 accomplishes this in response to the phase of the voltage across the tank circuit 1816. It will also be seen that there are no series inductors at all between the bridge rectifier 1818 of the main power supply and the tank circuit 1816. The phase-responsive control of the IGBTs in the H-bridge 1820 is one means by which the device is protected against overcurrent, and another means involves the direct monitoring of the instantaneous current through the IGBTs via pickup coil 1852, by pump controller 1846. Should the current through the IGBTs exceed a predetermined threshold value at any time, the pump controller 1846 will shut down the apparatus to prevent damage. Moreover, since the apparatus heats workpieces inductively rather than by infrared radiation or hot air convection, shutdown can be accomplished almost immediately.

Figure 19:
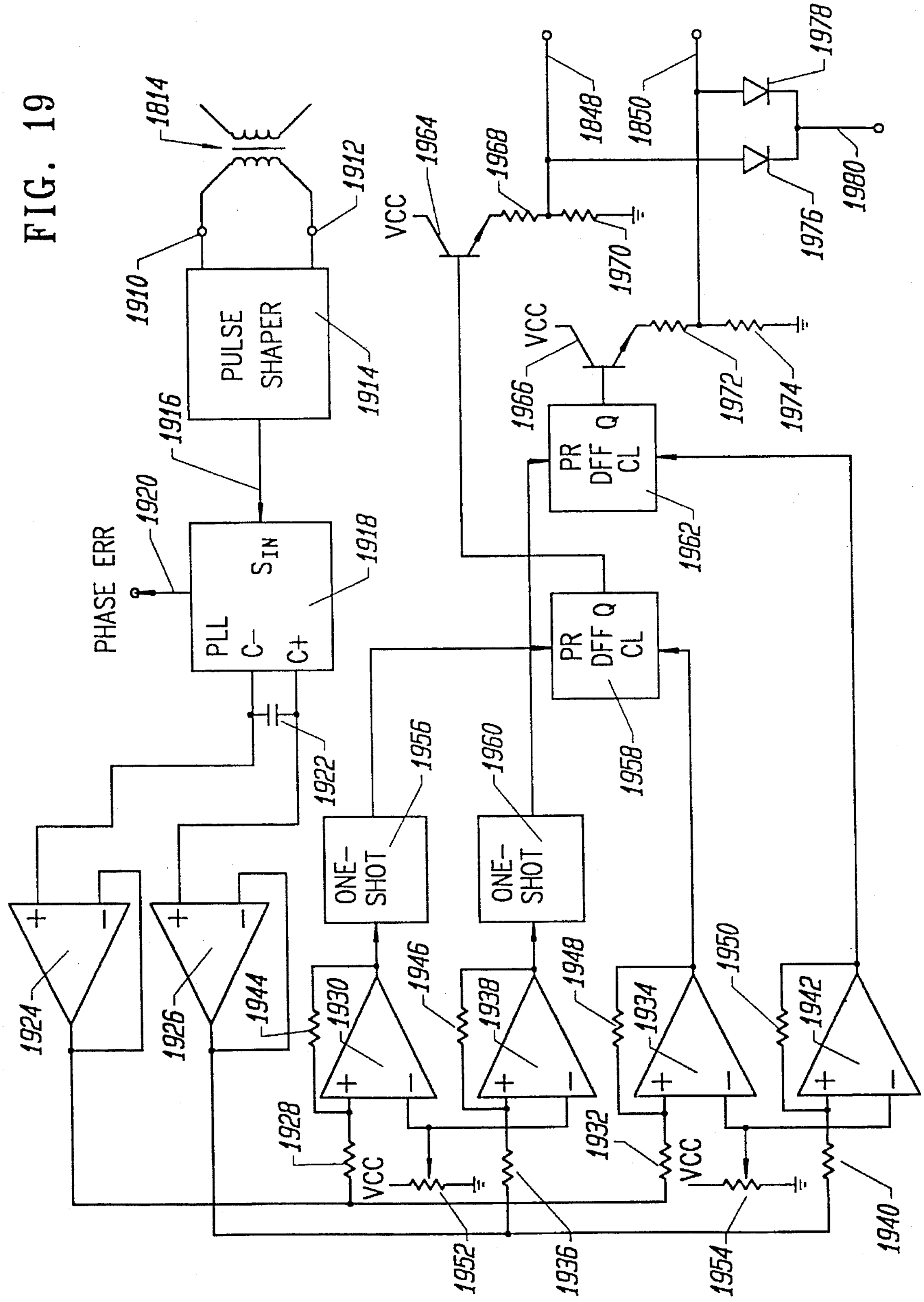

FIG. 19 is a block diagram of the H-bridge control portion of pump controller 1846. The secondary of pickoff transformer 1814 (FIG. 18) is connected across input terminals 1910 and 1912 of a pulse shaper 1914. The pulse shaper 1914 converts the substantially sinusoidal input voltage to a square wave, and provides the signal over a line 1916 to the signal input of a phase lock loop (PLL) 1918. PLL 1918 may be, for example, a 4046 manufactured by National Semiconductor Corporation. The PLL 1918 indicates when a phase lock has been achieved by driving a signal line 1920 low, essentially making signal line 1920 an active high phase error signal. The phase error signal 1920 is used as described hereinafter.

AVCO capacitor 1922 is connected across the VCO C− and C+ pins of PLL 1918, which pins are also connected to the non-inverting inputs of respective followers 1924 and 1926. The inverting input of follower 1924 is connected to its output, which is also connected via a resistor 1928 to the non-inverting input of a comparator 1930, and via a resistor 1932 to the non-inverting input of a comparator 1934. The inverting input of follower 1926 is connected to its output, which is also connected via a resistor 1936 to the non-inverting input of a comparator 1938, and via a resistor 1940 to the non-inverting input of a comparator 1942. The output of comparator 1930 is coupled back to its non-inverting input via a resistor 1944. Similarly, the output of comparator 1938 is connected back to its non-inverting input via a resistor 1946; the output of comparator 1934 is coupled back to its non-inverting input by a resistor 1948; and the output of comparator 1942 is coupled back to its non-inverting input via a resistor 1950. The inverting input to each of the comparators 1930 and 1938 are connected together and to the common of a potentiometer 1952, which is connected across VCC and ground. Similarly, the inverting inputs to comparators 1934 and 1942 are connected together and to the common of a potentiometer 1954, which is connected across VCC and ground.

The output of comparator 1930 is connected to the input of a one-shot 1956, the output of which is connected to the preset input of a D flip-flop 1958. The output of comparator 1938 is connected to the input of a one-shot 1960, the output of which is connected to the preset input of a D flip-flop 1962. The output of comparator 1934 is connected to the clear input of flip-flop 1958, and the output of comparator 1942 is connected to the clear input of flip-flop 1962. The one-shots 1956 and 1960 may be, for example, 4538 monostable multivibrators manufactured by National Semiconductor Corp., and the flip-flops 1958 and 1962 may be 4013's manufactured by National Semiconductor. It will be appreciated that the D flip-flops 1958 and 1962 can also if desired be replaced by other types of flip-flops, for example, set/reset flip-flops.

The Q output of flip-flop 1958 is connected to the base of a transistor 1964, the collector of which is connected to VCC. The Q output of flip-flop 1962 is connected to the base of a transistor 1966, the collector of which is connected to VCC. Transistors 1964 and 1966 are both NPN transistors. The emitter of transistor 1964 is coupled through a resistor divider made up of resistors 1968 and 1970 to ground, and the emitter of transistor 1966 is coupled through a resistor divider made up of resistors 1972 and 1974 to ground. The junction between resistors 1968 and 1970 forms the control signal 1848 (FIG. 18), and the junction between the resistors 1972 and 1974 forms the control signal output 1850 (FIG. 18). Both the control signals 1848 and 1850 are connected to anodes of respective diodes 1976 and 1978, the cathodes of which are connected together and to a terminal 1980. As explained in more detail below, a safety circuit in the pump controller 1846 can pull terminal 1980 low and thereby immediately shut down the drivers for all four IGBTs in the H-bridge 1820.

Figure 20:
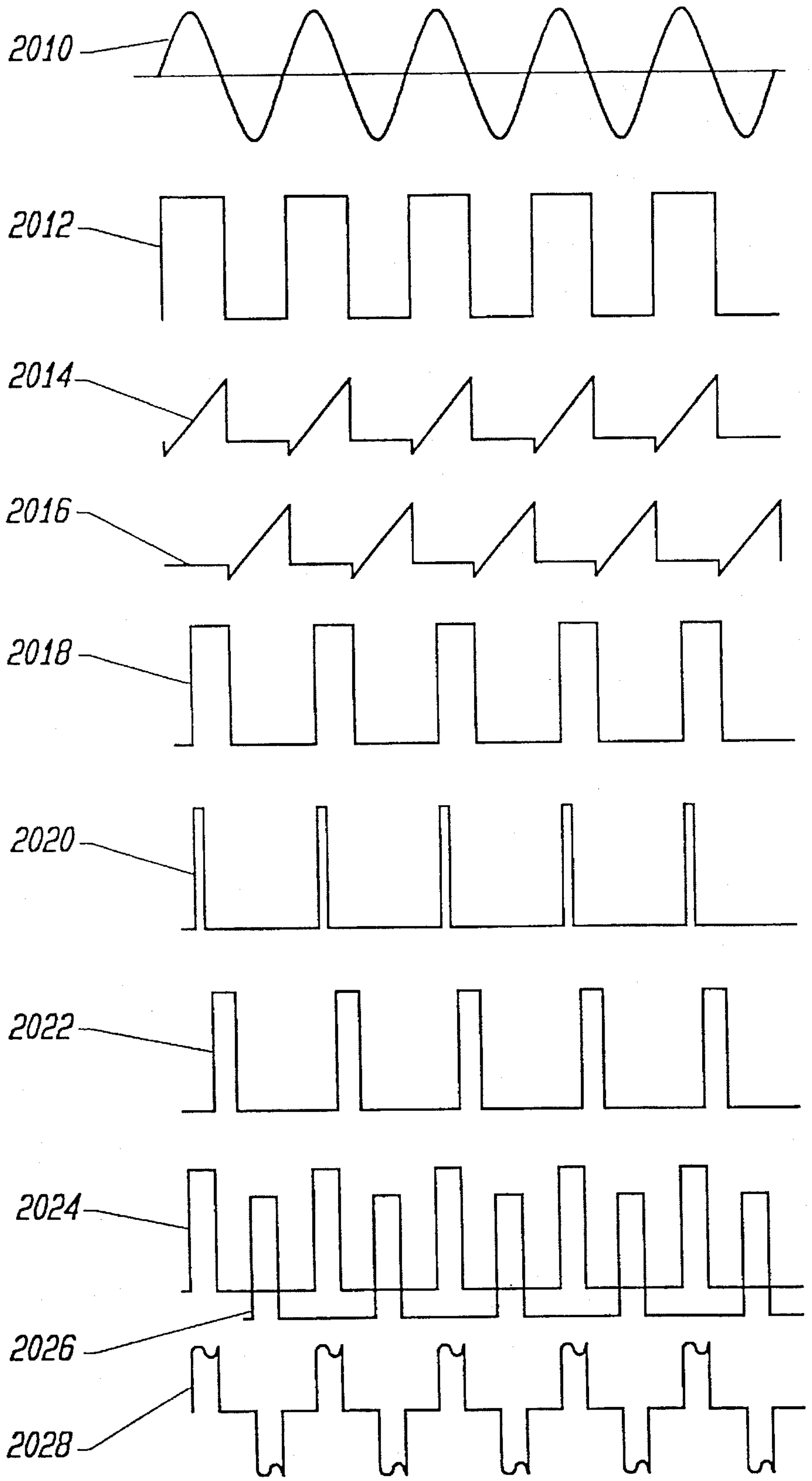
FIG. 20 is a waveform diagram useful for explaining the operation of the circuitry of FIG. 19.

The operation of the H-bridge control circuitry of FIG. 19 is best understood with reference to the waveform diagram of FIG. 20. In FIG. 20, waveform 2010 represents the voltage waveform across the tank circuit 1816. The voltage is essentially sinusoidal, having alternating opposite voltage extremes with voltage zeros between each pair of extremes. This waveform is picked off by transformer 1814 and provided to pulse shaper 1914 (FIG. 19), which generates on line 1916 the square wave shown as waveform 2012 in FIG. 20. The waveform 2012 has the same phase as the waveform 2010, with edge transitions occurring at the same time as the zeros in waveform 2010.

Waveform 2014 represents the C+ output of PLL 1918. It can be seen that waveform 2014 is made up essentially of positive going ramps when the tank voltage is above zero, which transition to a flat zero voltage when the tank voltage goes below zero. Similarly, waveform 2016 represents the voltage on the C− output of PLL 1918. Waveform 2016 has positive going ramps when the tank voltage is below zero, and transitions to a zero voltage when the tank voltage goes above zero. These waveforms 2014 and 2016 need not be perfect ramps, but should be monotonic for this circuit in the time periods shown.

Waveform 2018 represents the output of comparator 1930. This device essentially compares the instantaneous voltage of the ramp output of C−, to a threshold voltage set manually by potentiometer 1952. When the C− ramp voltage exceeds the threshold voltage, the output of comparator 1930 goes high. When the C− ramp voltage transitions back to zero, the output of comparator 1930 also transitions back to zero. Accordingly, the output of comparator 1930 is a series of pulses, whose rising edges may be preset using potentiometer 1952 to occur when the tank voltage reaches a predetermined phase of its cycle, and whose falling edges occur on the immediately following zero crossing of the tank voltage.

The output of comparator 1930 is provided to the input of one-shot 1956, the output of which is depicted in waveform 2020. Essentially, one-shot 1956 merely generates a short positive-going spike at the rising edge of each pulse of waveform 2018..

The C− ramp signal is also provided to the comparator 1934, the output of which is depicted in waveform 2022 in FIG. 20. Like comparator 1930, comparator 1934 compares the ramp voltage with a threshold voltage presetable via a potentiometer 1954, and brings it output high only when the ramp voltage exceeds the preset threshold. The output of comparator 1934 goes low again when the C− ramp voltage transitions back to zero volts. Accordingly, the output of comparator 1934 is a series of pulses whose rising edges can be set manually to occur at a presetable phase of the tank voltage cycle, and whose falling edge occurs when the tank voltage drops below zero. It should be noted that for comparators 1930 and 1934, the settings for potentiometers 1952 and 1954 can represent only phases within the first half of each cycle of the tank voltage, that is, while the tank voltage is positive. For reasons which will become apparent, the potentiometer 1952 should be set to represent a phase in the first 90° of a tank voltage cycle, and the potentiometer 1954 should be set to represent a phase in the second 90° of the tank voltage cycle.

The outputs of one-shot 1956 and comparator 1934 are provided respectively to the preset and clear inputs of the flip-flop 1958. Accordingly, as shown in waveform 2024, the flip-flop 1958 will generate on its Q output a waveform having a series of positive going pulses, each of which begins at the phase of the tank voltage indicated by potentiometer 1952, and ends at the phase of the tank voltage indicated by potentiometer 1954.

The output of flip-flop 1962 is generated in a similar manner to that of flip-flop 1958, and therefore will not be described explicitly here. It will be apparent, however, that the output of flip-flop 1962 will have a similar waveform to waveform 2024 (FIG. 20), except shifted by 180° of the tank voltage. This is shown in waveform 2026, superimposed on waveform 2024 for clarity. It will be appreciated that the beginning of each pulse in waveform 2026 is set by the same potentiometer 1952 as that which sets the beginning of each pulse in waveform 2024, and represents the same phase in the negative half of the tank voltage cycle as the start of each pulse in waveform 2024 represents in the positive half of each tank voltage cycle. Similarly, the end of each pulse in waveform 2026 occurs in response to the same threshold setting of potentiometer 1954 which determines the end of each pulse in waveform 2024. The end of each pulse in waveform 2026 occurs at the same phase in the negative half of a tank voltage cycle at which the end of each pulse in waveform 2024 occurs in the positive half of each tank voltage cycle.

The Q output of flip-flop 1958 is provided through some driving circuitry or with a control line 1848 to the driver boards 1830 and 1836 of the H-bridge 1820 (FIG. 18). Accordingly, the IGBTs 1822 and 1828 will turn on to conduct current into the tank circuit 1816 only during the high-going pulses of waveform 2024. Similarly, the output of flip-flop 1962 is provided via driving circuitry and control line 1850 to the IGBT drivers 1834 and 1832. Corresponding IGBTs 1826 and 1824 will therefore turn on and conduct current into the tank circuit 1816 only during the high-going pulses of waveform 2026. The current in the latter case flows through the tank circuit 1816 in the opposite direction as it does in the former case.

In order to minimize wear and tear on the IGBTs in the H-bridge 1820, it is advantageous to set the potentiometers 1952 and 1954 so as to minimize the peak currents which must flow through such IGBTs. Accordingly, it is advantageous to include in the period in which IGBTs 1822 and 1828 are enabled, the time in each cycle when the voltage across the tank circuit 1816 is at its maximum. At that time, the voltage drop from the collector to the emitter of IGBT 1822 will be at its minimum, thereby minimizing the current flow therethrough. Similarly, the voltage drop between the collector and emitter of IGBT 1828 will also be at a minimum at this time, thereby minimizing the current flow through IGBT 1828. The time period during which IGBTs 1822 and 1828 are enabled, therefore, should be set via potentiometers 1952 and 1954 to start and end at appropriate phase angles before and after, respectively, the voltage maximum of each cycle of tank circuit 1816. Similarly, for the same reasons, in order to minimize the peak current flow through IGBTs 1826 and 1824, the potentiometers 1952 and 1954 should be set to enable these IGBTs for an appropriate period of time around the voltage minimum of the waveform on tank circuit 1816.

Waveform 2028 (FIG. 20) depicts the current waveform across the H-bridge when the potentiometers 1952 and 1954 are set to enable IGBTs just before each voltage extreme and disable them just after each voltage extreme. As can be seen, the waveform consists of a series of alternating positive and negative going pulses, the active periods of which have a magnitude which begins by rising to a maximum, then dipping down to a minimum at the same time that the tank voltage waveform reaches an extreme, and then rising again until cut off by the end of the pulse. Applicants have discovered that peak current through the IGBTs is minimized when the potentiometers 1952 and 1954 are adjusted such that each pulse cuts off just as the current magnitude once again reaches the maximum achieved during the first part of the pulse. In an alternative embodiment, an H-bridge control circuit may be provided which automatically samples and holds the peak value in the first part of the pulse and terminates the pulse when that peak is once again achieved.

Figure 1:
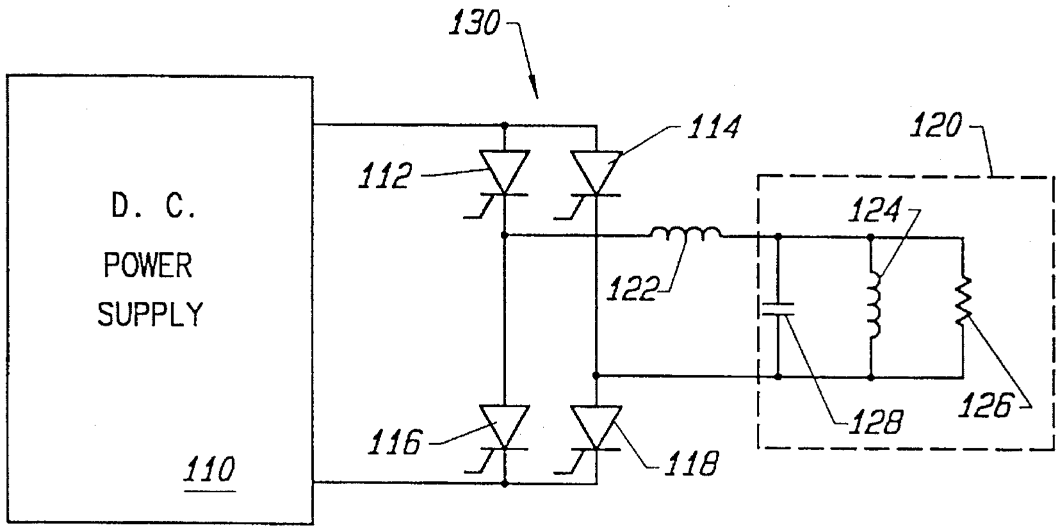
FIG. 1 is a schematic diagram of prior art inductive heating circuitry.
Figure 21:
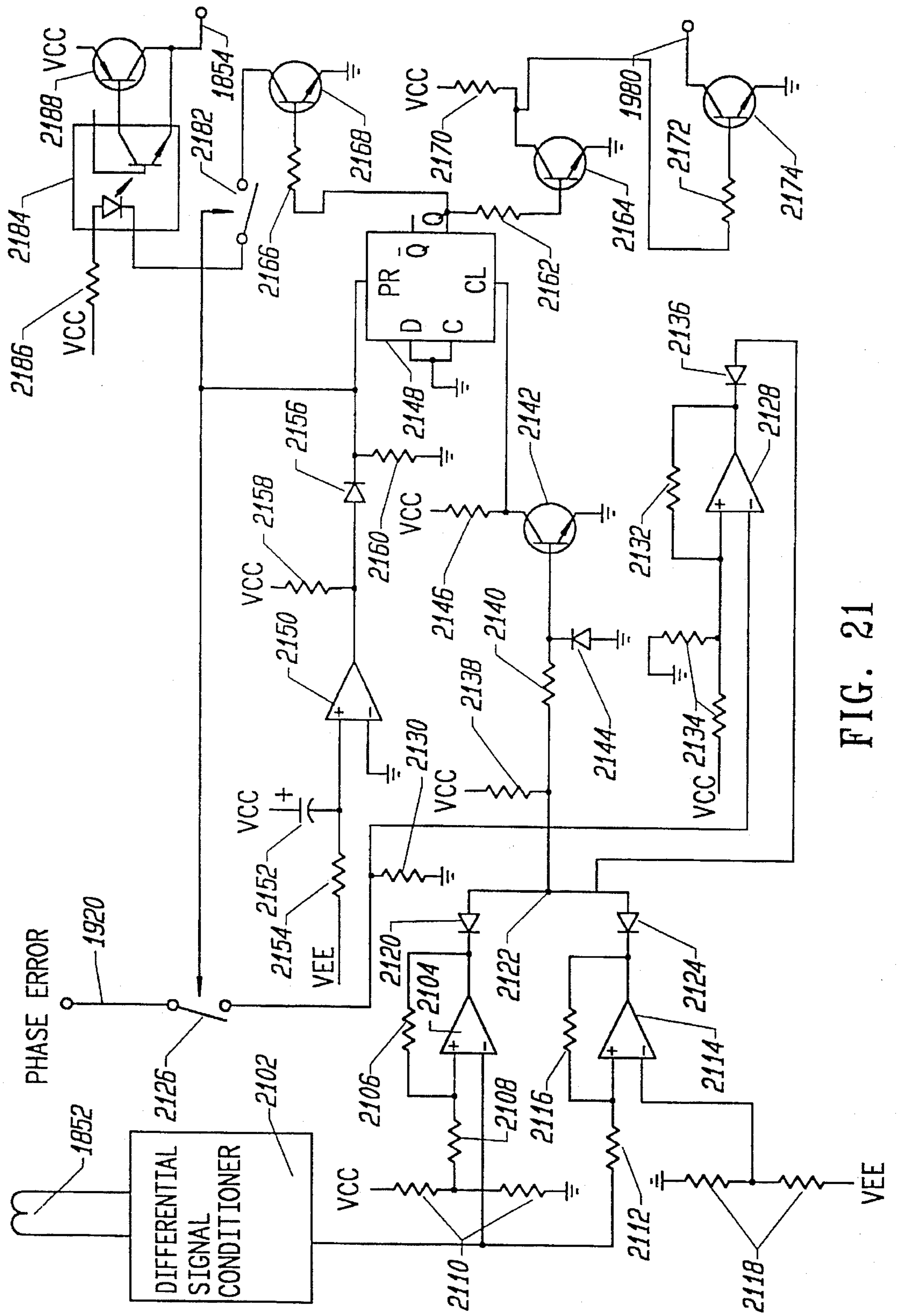

As mentioned above, pump controller 1846 (FIG. 18) also includes certain safety features which help protect against unwanted current surges which in the past have been averted by a series inductor such as that shown in FIG. 1. FIG. 21 shows the circuitry for implementing some of these safety features.

In FIG. 21, the current pick-up coil 1852 is connected to two inputs of a differential signal conditioner 2102. The signal conditioner 2102 mainly filters noise from the pick-up signal and brings it into a normalized range. The output of the differential signal conditioner 2102 is connected to the inverting input of a comparator 2104, the output of which is coupled back to the non-inverting input of comparator 2104 via a resistor 2106. The non-inverting input of comparator 2104 is also connected via a resistor 2108 to the junction point of a resistor divider 2110 coupled between VCC and ground. The output of differential conditioner 2102 is also connected via a resistor 2112 to the non-inverting input of another comparator 2114, the output of which is connected back to the non-inverting input via a resistor 2116. The inverting input of comparator 2114 is connected to the junction point of a resistor divider 2118 coupled between ground and VEE. In this circuit, VCC may be +15 volts and VEE may be −15 volts. The output of comparator 2104 is connected to the cathode of a diode 2120, the anode of which is connected to a junction node 2122. Similarly, the output of comparator 2114 is connected to the cathode of a diode 2124, the anode of which is connected to node 2122.

The phase error signal 1920 from the PLL 1918 (FIG. 19) is coupled through an analog switch 2126 to the inverting input of another comparator 2128 and via a resistor 2130 to ground. The output of comparator 2128 is connected back to its non-inverting input via a resistor 2132, and to the .junction point of a resistor divider 2134 coupled between VCC and ground. The output of comparator 2128 is connected to the cathode of a diode 2136, the anode of which is connected to the node 2122.

The node 2122 is coupled via a resistor 2138 to VCC, and through a resistor 2140 to the base of a transistor 2142. The base of transistor 2142 is also connected to the cathode of a diode 2144, the anode of which is connected to ground. The emitter of transistor 2142 is connected to ground, and the collector is connected via a pull-up resistor 2146 to VCC and also to the clear input of a D flip-flop 2148.

A comparator 2150 is also provided which has its inverting input connected to ground and its non-inverting input connected to the junction point between a capacitor 2152 to VCC and a resistor 2154 to VEE. The capacitor 2152, the resistor 2154 and the comparator 2150 cooperate to provide a power-on time delay on the order of 5–10 seconds. The output of comparator 2150 is connected to the anode of a diode 2156, and via a resistor 2158 to VCC. The cathode of diode 2156 is connected via a resistor 2160 to ground and also to the preset input of D flip-flop 2148. The cathode of diode 2156 is further connected to the control input of analog switch 2126.

The Q output of flip-flop 2148 is connected via a resistor 2162 to the base of the transistor 2164, and also via a resistor 2166 to the base of the transistor 2168. The emitters of transistors 2164 and 2168 are connected to ground. The collector of transistor 2164 is pulled high by a pull-up resistor 2170 to VCC, and is also connected via a resistor 2172 to the base of another transistor 2174. The emitter of transistor 2174 is connected to ground, and the collector is the shut-off line 1980 shown in FIG. 19. The collector of transistor 2168 is connected via an analog switch 2182 to the cathode of an LED in an opto-isolator 2184, the anode of which is connected via a resistor 2186 to VCC. The control input to the analog switch 2182 is connected to the cathode of diode 2156. The collector of the NPN output transistor of the opto-isolator 2184 is connected to the base of a PNP transistor 2188, the emitter of which is connected to VCC. The emitter of the output transistor in opto-isolator 2184 is connected to the collector of transistor 2188 and also forms the shut-down signal 1854 provided to microcomputer 1842 (FIG. 18). The analog switches 2126 and 2182 may be implemented in a 4016 chip manufactured by National Semiconductor Corp., and are connected to be closed when the control signal is low and open when the control signal is high.

In operation, on power-up, the comparator 2150 provides an output signal which is high for 5–10 seconds, after which it goes low. This presets the flip-flop 2148, which disconnects shut-off signal 1980. As previously explained with respect to FIG. 19, a low voltage on line 1980 forces all the IGBTs in the H-bridge 1820 to remain off, but when line 1980 is disconnected the IGBTs are permitted to operate normally. Also during this power-up time, since the control input to analog switch 2182 is high, the switch is open and transistor 2188 is off. The signal 1854 to the microcomputer 1842 is pulled low by a pull-down resistor (not shown) in the microcomputer 1842. Analog switch 2126 is also open at this time, and is pulled low by a resistor 2130. The output of comparator 2128 is therefore high, and diode 2136 is reversed biased. The phase error signal 1920 therefore has no effect on node 2122 at this time. The outputs of comparators 2104 and 2114 may also be assumed to be high at this time, thereby reversed biasing diodes 2120 and 2124. Node 2122 is thereby pulled high by resistor 2138, resulting in an inactive (low) value provided to the clear input of flip-flop 2148. Even if an active (high) value were to be provided to the clear input of flip-flop 2148 at this time, however, it would have no effect as long as the preset input remains high.

After the capacitor 2152 charges up sufficiently, the comparator 2150 output drops to a low voltage. In combination with the pull-down resistor 2160, the cathode of diode 2156 is thereby brought low, permitting analog switches 2126 and 2182 to conduct. This also terminates the presetting of flip-flop 2148. Unless immediately cleared, the Q output of flip-flop 2148 remains high and causes transistor 2168 to .conduct. This activates the LED in isolator 2184, thereby pulling line 1854 high and signalling to the microcomputer 1842 to turn on the main power supply.

During normal operation, the circuit of FIG. 21 constantly monitors the current passing through the IGBTs of H-bridge 1820 and being pumped into the tank circuit 1816 via current pickoff 1852. Should the instantaneous current at any time exceed a threshold maximum set by resistor divider 2110, comparator 2104 will pull node 2122 low, thereby turning off transistor 2142 and activating the clear input of flip-flop 2148. Similarly, should the instantaneous current at any time go below a negative threshold set by resistor divider 2118, comparator 2114 will pull node 2122 low and cause activation of the clear input of flip-flop 2148. Also, should phase lock loop 1918 (FIG. 19) detect a phase error at any time, its activation of the phase error line 1920 will also result in node 2122 being pulled low and cause activation of the clear input of flip-flop 2148.

When flip-flop 2148 clears, transistors 2168 and 2164 both turn off. This permits the signal on line 1854 to be pulled low by the pull-down resistor in microcomputer 1842, and also actively pulls the signal on line 1980 low. The low value on line 1854 signals the microcomputer 1842 to shut down the system, and the low voltage on line 1980 immediately shuts off all the IGBTs in the H-bridge 1820 as previously described. In this manner, the system is protected against overcurrent through the H-bridge 1820 even without requiring a series inductance.

Figure 24:
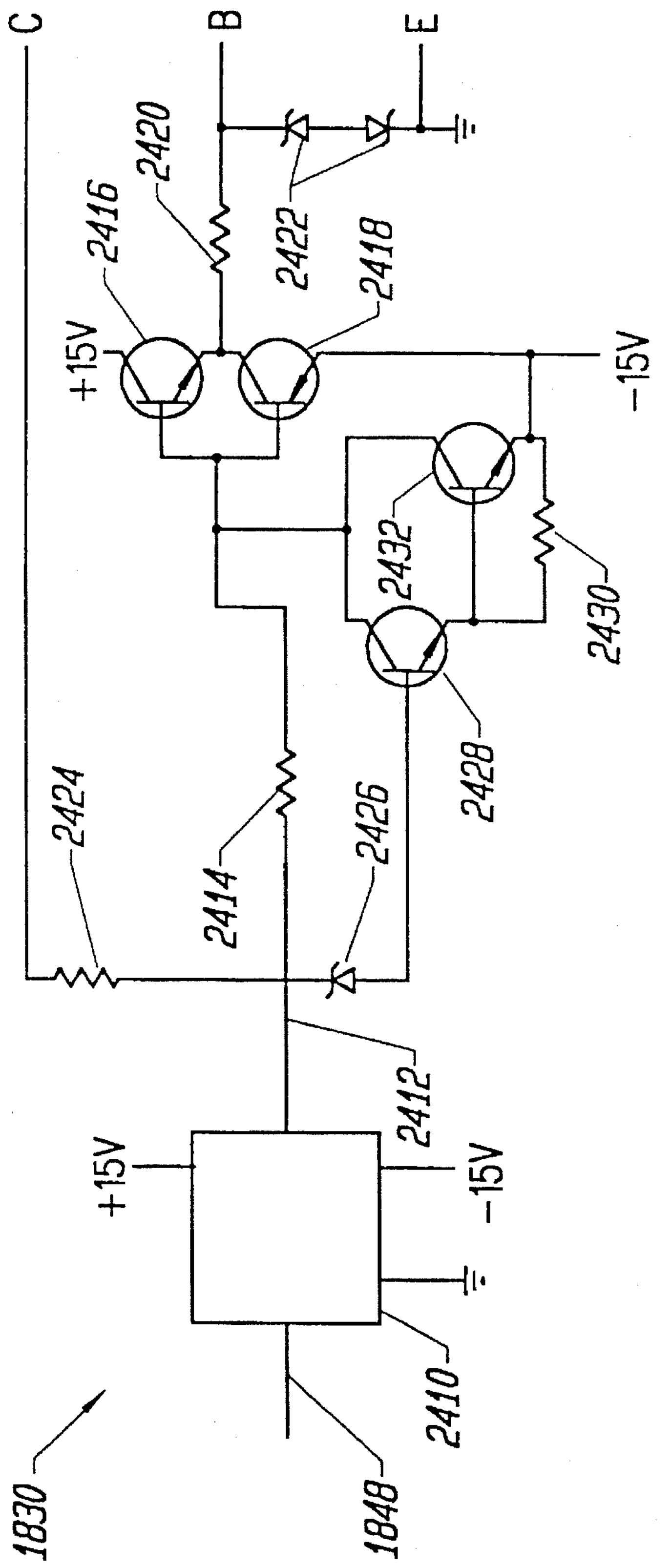
FIG. 24 is a schematic diagram of an IGBT driver board of FIG. 18.

FIG. 24 is a schematic diagram of one of the IGBT driver boards 1830 shown in FIG. 18. The other driver boards 1832, 1834 and 1836 are identical. The driver 1830 comprises an opto-isolator 2410 having pair of input lines coupled respectively to the control signal line 1848 (FIG. 18) and the ground on pump controller 1846. The output side of opto-isolator 2410 is connected to +/−15 volt outputs of a separate on-board power supply (not shown), and provides an output signal on line 2412. The line 2412 is coupled through a resistor 2414 to the base of an NPN transistor 2416, the collector of which is connected to the +15 volt supply. The base of transistor 2416 is also connected to the base of a PNP transistor 2418, the collector of which is connected to the emitter of transistor 2416. The emitter of transistor 2418 is connected to the −15 volt supply. The junction point between the emitter of transistor 2416.and the collector of transistor 2418 is coupled through a resistor 2420 to the base of IGBT 1822 (FIG. 18). The base of IGBT 1822 is also coupled via oppositely oriented, series coupled, 15 volt Zener diodes 2422 to ground. The emitter of IGBT 1822 is also coupled to ground. The collector of IGBT 1822 is coupled through a resistor 2424 to the cathode of a 100 volt Zener diode 2426, the anode of which is connected to the base of another NPN transistor 2428. The emitter of transistor 2428 is coupled through a resistor 2430 to the −15 volt supply, and is also coupled to the base of an NPN transistor 2432. The collectors of transistors 2428 and 2432 are connected together and to the bases of transistors 2416 and 2418.

In normal operation, a pulse received on line 1848 is transmitted by the opto-isolator 2410 as a positive going pulse on line 2412. The signal is buffered by transistors 2416 and 2418 to provide a positive going pulse on the base line for IGBT 1822. Zener diodes 2422 provide an additional level of protection by preventing the base lead from ever exceeding + or −15 volts. In addition, should the collector of IGBT 1822 ever exceed 85 volts, Zener diode 2426 will break down and transistors 2428 and 2432 will pull the bases of transistors 2416 and 2418 down close to −15 volts. This additional level of protection will keep the base drive current of the IGBT 1822 off when the voltage across the IGBT exceeds approximately 85 volts, regardless of the signals arriving on line 1848.

Induction heating systems can be quite noisy electrically, and the usual precautions, in addition to those mentioned above, should be taken in the design of the electronic control circuitry to control such noise. For example, shielded, twisted pair wiring should be used wherever possible.

The apparatus and methods described above may be used to achieve efficiencies (defined as the ratio of the energy coupled into the workpiece to the energy drawn from the source into the AC power supply) up to 90% or more, although a practical system may be limited to about 70–80%. This figure compares to prior art efficiency levels, which have always been significantly below 70%.

The invention has been described with respect to particular embodiments thereof, and numerous variations are possible within its scope. For example, the invention is not limited to metal can closures, but can also be used with other, preferably but not necessarily flat, electrically conductive workpieces. As another example, single phase pump circuits can be used instead of the double phase pump circuit described herein. Similarly, other types of connections to the tank circuit may be used aside from an H-bridge, and if the disadvantages are acceptable, other types of switches may be used instead of IGBTs. As another example, where the above circuitry monitors current or voltage for various purposes, it would be equivalent to monitor voltage or current instead, respectively, with appropriate modifications in the circuitry. Also, whereas pancake coils are shown above wrapped as far around a conveyance path as possible, advantages of the invention are achieved when the coil is wrapped to any greater degree than mere flat coils, mounted on only one side of the workpiece as in the prior art. The more complete the wrapping the better, but advantages will be noticed if it is wrapped ¾, or even ⅔ of the way around. Many other variations will be apparent.

We claim:

1. Apparatus for heating an electrically conductive workpiece, comprising:

a path of travel along which said workpiece is being moved longitudinally, said path of travel having a longitudinal segment;

a non-liquid cooled induction coil at least partly enclosing said longitudinal segment of said path of travel; and a source of electrical current oscillating between approximately 6 kHz and approximately 18 kHz, said source being coupled to pass said current through said induction coil.

2. Apparatus according to claim 1, wherein said induction coil comprises a pancake coil wrapped at least partly around said longitudinal segment of said path of travel.

3. Apparatus according to claim 2, further comprising a tube enclosing said longitudinal segment of said path of travel circumferentially, wherein said pancake coil subtends substantially completely around said tube circumferentially.

4. Apparatus according to claim 1, further for heating a plurality of said electrically conductive workpieces, wherein said workpieces comprise plate-like objects in face-to-face contact with each other, and wherein said objects are being moved in-stick along said path of travel.

5. Apparatus according to claim 1, wherein said source comprises:

a tank circuit including a work coil being said induction coil, said tank circuit having first and second terminals and having an oscillating voltage on said first terminal relative to said second terminal, said oscillating voltage having alternating opposite voltage extremes and a voltage zero between each of said extremes; and pump means for coupling energy into said tank circuit only during coupling times which include at least a given one of said voltage extremes but exclude said voltage zeros.

6. Apparatus according to claim 5, wherein said coupling times include at least every second one of said voltage extremes.

7. Apparatus according to claim 6, wherein said oscillating voltage has a plurality of cycles each having two adjacent ones of said voltage extremes, wherein said pump means comprises:

monitoring means for monitoring said oscillating voltage and generating a control signal in response to each of said cycles indicating said coupling times; and coupling means for coupling energy into said tank circuit in response to said control signal.

8. Apparatus according to claim 6, wherein said coupling times include a predetermined period which extends before and after each of said every second one of said voltage extremes, and exclude all other times from the zero prior to each of said every second one of said voltage extremes to the zero after each of said every second one of said voltage extremes.

9. Apparatus according to claim 5, wherein said coupling times include all of said voltage extremes.

10. Apparatus according to claim 5, wherein said pump means includes a power supply having a power supply terminal and a series wire coupled between said power supply terminal and said tank circuit, further comprising:

a pickup coil wrapped around said series wire;

comparator means for comparing the voltage across said pickup coil to a voltage indicative of said threshold and generating an over-current signal; and shutdown means for shutting down said power supply in response to said over-current signal.

11. Apparatus according to claim 5, wherein said pump means comprises:

a power supply having first and second power supply terminals; and first switch means for enabling at first desired times a first current path from said first power supply terminal, through said work coil, to said second power supply terminal, said first current path having substantially no inductance apart from that of said work coil.

12. Apparatus according to claim 11, wherein said work coil has first and second terminals, and wherein said first switch means comprises a first IGBT having first and second current path terminals and a control terminal, said first current path terminal of said first IGBT being coupled to said first power supply terminal and said second current path terminal of said first IGBT being coupled to said first terminal of said work coil.

13. Apparatus according to claim 12, wherein said tank circuit further includes a capacitor coupled across said work coil.

14. Apparatus according to claim 12, wherein said current limiting means comprises:

a pickup coil wrapped around said first current path;

comparator means for comparing the voltage across said pickup coil to a voltage indicative of said threshold and generating an over-current signal; and shutdown means for shutting down said first current path in response to said over-current signal.

15. Apparatus according to claim 5, wherein said pump means comprises:

a power supply having first and second terminals; and a first IGBT having first and second current path terminals, said first current path terminal of said first IGBT being coupled to said first terminal of said power supply and said second current path terminal of said first IGBT being coupled to said first terminal of said tank circuit.

16. Apparatus according to claim 15, further comprising second, third and fourth IGBTs, each having first and second current path terminals, said first current path terminal of said second IGBT being coupled to said second terminal of said work coil, said second current path terminal of said second IGBT being coupled to said second power supply terminal, said first current path terminal of said third IGBT being coupled to said first power supply terminal, said second current path terminal of said third IGBT being coupled to said second terminal of said work coil, said first current path terminal of said fourth IGBT being coupled to said first terminal of said work coil and second current path terminal of said fourth IGBT being coupled to said second power supply terminal.

17. Apparatus according to claim 15, further comprising:

- a first current path connecting said first current path terminal of said first IGBT to said first terminal of said power supply;
- a second current path connecting said second current path terminal of said first IGBT to said first terminal of said tank circuit; and
- a third current path coupling said second terminal of said tank circuit to said second terminal of said power supply, said first, second and third current paths all having substantially no inductance.

18. Apparatus according to claim 6, wherein said coupling times are such as to minimize the peak current flow through said pump means for said given one of said voltage extremes while coupling a predetermined amount of total energy for said given one of said voltage extremes.

19. Apparatus according to claim 1, comprising:

- a tank circuit including a work coil being said induction coil, said tank circuit having first and second terminals and having an oscillating voltage on said first terminal relative to said second terminal, said oscillating voltage having cycles each having two opposite voltage extremes;
- a power supply having first and second terminals each having a voltage;
- first switch means for enabling a first current path from said first power supply terminal through said work coil to said second power supply terminal; and
- control means for activating said first switch means only during first activation periods during each cycle of said oscillating voltage, said first activation periods including a first one of said voltage extremes in each of said cycles and excluding the other of said voltage extremes in each of said cycles, said first one of said voltage extremes in each of said cycles being the voltage extreme closest to said voltage of said first power supply terminal.

20. Apparatus according to claim 19, wherein said first switch means comprises:

- a first switch series coupled between said first power supply terminal and said first terminal of said tank circuit; and
- a second switch series coupled between said second terminal of said tank circuit and said second power supply terminal.

21. Apparatus according to claim 19, wherein said control means comprises means for activating said first switch means at a predetermined first time period prior to each first one of said voltage extremes, and for deactivating said first switch means at a predetermined second time period following each first one of said voltage extremes.

22. Apparatus according to claim 21, wherein said first and second time periods are preset as a function of the phase of said oscillating voltage in each of said cycles.

23. Apparatus according to claim 21, wherein a switch current flows through said first current path while enabled by said first switch means, said switch current having a peak magnitude during said first time period prior to each given one of said first voltage extremes, and wherein said second time period is predetermined to end substantially when the magnitude of said switch current during said second time period reaches said peak magnitude.

24. Apparatus according to claim 23, wherein said first and second time periods are preset as a function of the phase of said oscillating voltage in each of said cycles.

25. Apparatus according to claim 23, wherein said control means further comprises a peak detector coupled to detect and hold a signal indicating said peak magnitude, and for deactivating said first switch means in response to said magnitude of said switch current reaching said peak magnitude during said second time period.

26. Apparatus according to claim 23, wherein said first switch means comprises an IGBT.

27. Apparatus according to claim 19, wherein said control means comprises:

- voltage detection circuitry coupled across said tank circuit and having an output;
- a phase locked loop coupled to said output of said voltage detection circuitry and having a first output which monotonically increases while the voltage on said output of said voltage detection circuitry is positive;
- a first potentiometer coupled to provide a first presetable voltage;
- a first comparator coupled to said first output of said phase locked loop and to said first potentiometer and having an output which is active when said first output of said phase locked loop has a voltage higher than said first presentable voltage of said first potentiometer;
- a second potentiometer coupled to provide a second presetable voltage;
- a second comparator coupled to said first output of said phase locked loop and to said second potentiometer and having an output which is active when said second output of said phase locked loop has a voltage higher than said second presetable voltage of said second potentiometer; and
- means for enabling said first switch means in response to said output of said first comparator becoming active and for disabling said first switch means in response to said output of said second comparator becoming active.

28. Apparatus according to claim 27, wherein said phase locked loop further has a second output which monotonically increases while the voltage on said output of said voltage detection circuitry is negative, said apparatus further comprising:

- second switch means for enabling a second current path from said second power supply terminal through said work coil to said first power supply terminal;
- a third comparator coupled to said first output of said phase locked loop and to said first potentiometer and having an output which is active when said first output of said phase locked loop has a voltage magnitude higher than said first presetable voltage of said first potentiometer;
- a fourth comparator coupled to said first output of said phase locked loop and to said second potentiometer and having an output which is active when said second output of said phase locked loop has a voltage magnitude higher than said second presetable voltage of said second potentiometer; and means for enabling said second switch means in response to said output of said third comparator becoming active and for disabling said second switch means in response to said output of said fourth comparator becoming active.

29. Apparatus according to claim 1, wherein said induction coil is air cooled.

30. Apparatus according to claim 1, further comprising closed-loop temperature control means for turning off said source of electrical current in response to the temperature of said workpiece exceeding a predetermined threshold temperature.

31. Apparatus according to claim 1, wherein said workpiece has a non-solidified coating, and wherein said heating solidifies said coating.

32. Apparatus according to claim 1, wherein said workpiece is one of a plurality of electrically conductive can ends.

33. Apparatus according to claim 32, further comprising magnetic means for producing a magnetic field which is effective to cause said can ends to space apart to share said magnetic field.

34. Apparatus according to claim 33, further comprising means for circulating air between said can ends.

35. Apparatus according to claim 33, wherein said magnetic means maintains said can ends in spaced, face-to-face relationship.

36. Apparatus according to claim 35, wherein said magnetic means comprises a channel magnet extending longitudinally along said path of travel.

37. Apparatus according to claim 35, wherein said magnetic means comprises a flexible permanent magnet extending longitudinally along said path of travel.

38. Apparatus according to claim 36, further comprising:

a surface extending longitudinally along said path of travel, said channel magnet attracting said can ends toward said surface; and a second magnet attracting said can ends away from said surface, said apparatus further comprising vibration means for vibrating said can ends along said surface to facilitate magnetic spacing by said channel magnet and said second magnet.

39. Apparatus according to claim 33, further comprising:

a surface adjacent to said can ends; and means for overcoming friction between said can ends and said surface.

40. Apparatus according to claim 33, wherein said magnetic field is longitudinally graded along said path of travel.

41. Apparatus according to claim 33, wherein said path of travel is substantially horizontal, further comprising moving means for moving said can ends along said path of travel.

42. Apparatus according to claim 41, wherein said magnetic field is longitudinally graded along said path of travel, and wherein said moving means comprises said longitudinally graded magnetic field.

43. Apparatus according to claim 41, wherein said path has an input end and an exit end, and wherein said moving means comprises;

means for adding can ends to said input end of said path; and means for removing can ends from said exit end of said path.

44. Apparatus according to claim to claim 32, further comprising:

a magnet extending longitudinally along said path; and mounting means for holding said magnet closer to said path at a first longitudinal position along said path, and farther from said path at a second longitudinal position along said path.

45. Apparatus according to claim 44, wherein said path is substantially horizontal.

46. Apparatus according to claim 44, wherein said first longitudinal position constitutes an exit end of said path and said second longitudinal position constitutes an input end of said path, further comprising means for adding workpieces to said input end and means for removing workpieces form said exit end, to thereby move workpieces along said path in a direction from said input end toward said exit end.

47. Apparatus according to claim 32, wherein said can ends are held in face-to-face relationship with each other, further comprising a plurality of magnetic elements extending longitudinally along said path, different ones of said magnetic elements being disposed at different angular positions around said path, each of said magnetic elements being disposed and oriented at each longitudinal position along said path to apply an attractive force on said can ends in a respective direction of attraction which is radially toward the magnetic element, the attractive force in the respective direction of attraction for each given one of said magnetic elements at each particular longitudinal position being substantially equal to the sum of the attractive forces applied by all others of said magnetic elements at said particular longitudinal position in a direction opposite the direction of attraction of said given magnetic element.

48. Apparatus according to claim 47, wherein each of said magnetic elements comprises a pair of opposite magnetic poles each extending longitudinally and substantially parallel to each other along said magnetic element, said poles being oriented to create a magnetic flux path passing through said can ends.

49. Apparatus according to claim 48, wherein the poles of said magnetic elements alternate magnetic polarities circumferentially around said path.

50. Apparatus according to claim 48, wherein each of said magnetic elements comprises first and second permanent magnets each extending longitudinally and substantially parallel to each other along said magnetic element, said first permanent magnet having a north pole directed radially toward said path and further having a south pole, and said second permanent magnet having a south pole directed radially toward said path and further having a north pole.

51. Apparatus according to claim 32, wherein said can ends are held in face-to-face relationship with each other, further comprising:

a first magnet element extending longitudinally along said path, said first magnetic element having a north pole extending longitudinally along said path and directed substantially radially toward said path, said first magnetic element further having a south pole extending substantially parallel to said north pole of said first magnetic element and directed substantially radially toward said path; and a second magnetic element extending longitudinally along said path, said second magnetic element having a north pole extending longitudinally along said path and directed substantially radially toward said path, said second magnetic element further having a south pole extending substantially parallel to said north pole of said second magnetic element and directed substantially radially toward said path, said first and second magnetic elements opposing each other diametrically across said path, and being spaced substantially equally from said path radially at each longitudinal position along said path.

52. Apparatus according to claim 51, wherein said first and second magnetic elements are mounted radially more closely to said path at one end of said path than at the other end of said path.

53. Apparatus according to claim 51, further comprising a retaining surface disposed between each of said magnetic elements and said path such that the proximate edges of said can ends, when attracted radially toward one of said magnetic elements, are engaged by the retaining surface and prevented from reaching said one of said magnetic elements.

54. Apparatus according to claim 33, wherein said path follows a curved course, and wherein said magnetic means comprises a flexible permanent magnet disposed longitudinally along said curved course.

55. Apparatus according to claim 32, comprising magnetic moving means for magnetically moving said can ends along said path.

56. Apparatus according to claim 55, wherein said magnetic moving means comprises:

a plurality of electromagnets disposed longitudinally along said path; and control means for energizing said electromagnets sequentially in at least three phases.

57. Apparatus according to claim 55, further comprising means for holding said can ends in substantially face-to-face relationship.

58. Apparatus according to claim 56, wherein said electromagnets each comprise a pancake coil disposed below and facing said conveyance path, further comprising support means disposed above said electromagnets and along said conveyance path, for supporting said can ends lying flat on said support means.

59. Apparatus according to claim 56, wherein said electromagnets comprise said induction coil, and wherein said control means comprises means for energizing said electromagnets sequentially with bursts of oscillating current from said source of medium frequency oscillating electrical current.

60. Apparatus according to claim 55, comprising spacing means for spacing said can ends apart magnetically.

61. Apparatus for heating an electrically conductive workpiece, comprising:

a path of travel along which said workpiece is being moved longitudinally, said path of travel having a longitudinal segment;

a non-liquid cooled induction coil at least partly enclosing said longitudinal segment of said path of travel; and a source of medium frequency oscillating electrical current, said source being coupled to pass said current through said induction coil, wherein said induction coil comprises at least one wire wrapped entirely around said longitudinal segment of said path of travel.

62. Apparatus for heating an electrically conductive workpiece, comprising:

a path of travel along which said workpiece is being moved longitudinally, said path of travel having a longitudinal segment;

a non-liquid cooled induction coil at least partly enclosing said longitudinal segment of said path of travel; and a source of medium frequency oscillating electrical current, said source being coupled to pass said current through said induction coil, wherein said apparatus lacks cores which focus the magnetic field generated by said induction coil into said workpiece.

63. An induction heating method, comprising the steps of:

inserting into an oven a stick of nested, electrically conductive can ends, each of said can ends being disk-like and having a curl around its circumference, said oven having a path of travel having a longitudinal direction along which said can ends move, said path of travel having a longitudinal segment;

transporting said can ends along said longitudinal segment of said path of travel, in such a manner that said can ends remain separable but remain nested and in contact with each other;and inductively heating said can ends during said step of transporting said can ends along said longitudinal segment of said path of travel and while said can ends remain separable but remain nested and in contact with each other.

64. Apparatus for heating an electrically conductive workpiece, comprising:

a path of travel along which said workpiece is being move longitudinally, said path of travel having a longitudinal segment;

a tube enclosing said longitudinal segment of said path of travel circumferentially;

a pancake coil subtending substantially completely around said tube, said pancake coil including at least one pancake sub-coil; and a source of varying electrical current, said source being coupled to pass said current through said at least one pancake sub-coil.

65. Apparatus for heating an electrically conductive workpiece, comprising:

a path of travel along which said workpiece is being moved longitudinally, said path of travel having a longitudinal segment;

a tube having a tube wall enclosing said longitudinal segment of said path of travel circumferentially;

a magnet occupying a portion of arc of said tube wall;

a pancake coil subtending substantially completely around said tube wall circumferentially, except for said portion of arc occupied by said magnet, said pancake coil including at least one pancake sub-coil; and a source of varying electrical current, said source being coupled to pass said current through said at least one pancake sub-coil.

66. Apparatus according to claim 65, wherein said magnet is a permanent channel magnet extending longitudinally along said tube.

67. A method for treating a plurality of can lids, comprising the steps of:

inductively heating said can lids in face-to-face relationship with each other; and simultaneously spacing said can lids apart by producing a magnetic field which is effective to cause said can lids to space apart to share said magnetic field.

68. A method according to claim 67, wherein said step of inductively heating comprises the step of placing said can lids in an oscillating magnetic field, the frequency of said oscillating magnetic field being a medium frequency.

69. A method according to claim 68, further comprising the step of moving said can lids along a conveyance path during said heating.

70. A method according to claim 69, wherein said heating is responsive to the temperature of said can lids as they move along said conveyance path.

71. A method of treating electrically conductive can ends, comprising the steps of:

applying a water-based sealant compound to the can ends;

providing the can ends to an inlet of a dryer, the can ends already having the water-based sealant compound applied thereto;

transporting the can ends through the dryer in face-to-face relationship along an electrically nonconductive support structure; and during the transporting step, passing the can ends through an alternating magnetic field to induce current flow in the can ends to induction heat the can ends and thereby heat the compound applied to the can ends to remove water from the compound, wherein the electrically nonconductive support structure comprises an electrically nonconductive tube.

72. A method according to claim 71, wherein the magnetic field is produced by an electrical conductor wrapped around the tube, and wherein the electrical conductor is connected to an alternating current source.

73. A method of treating electrically conductive can ends, comprising the steps of:

applying a water-based sealant compound to the can ends;

providing the can ends to an inlet of a dryer, the can ends already having the water-based sealant compound applied thereto;

transporting the can ends through the dryer in face-to-face relationship along an electrically nonconductive support structure; and during the transporting step, passing the can ends through an alternating magnetic field to induce current flow in the can ends to induction heat the can ends and thereby heat the compound applied to the can ends to remove water from the compound, wherein the step of transporting the can ends through the dryer in face-to-face relationship comprises the step of transporting the can ends through the dryer in face-to-face contact.

74. A method of drying water-based sealant compound applied to electrically conductive can ends, comprising the steps of:

providing can ends to an inlet of a dryer, the can ends already having the water-based sealant compound applied thereto;

transporting the can ends through the dryer in face-to-face relationship along an electrically nonconductive support structure;

during the transporting step, passing the can ends through an alternating magnetic field to induce current flow in the can ends to induction heat the can ends and thereby heat the compound applied to the can ends to remove water from the compound;and during the transporting step, spacing the can ends apart magnetically.

75. A method according to claim 74, wherein the spacing step comprises the step of producing a magnetic field which is effective to cause the can ends to space apart to share the magnetic field.

76. Induction heating apparatus, comprising:

a plurality of can ends in face-to-face relationship with each other, said can ends having compound material applied thereto;

an electrically nonconductive support structured to support the can ends while being transported in face-to-face relationship along the support;

an alternating current source;

an electrical conductor connected to the alternating current source and disposed insufficient proximity to the support to produce an alternating magnetic field within the support; and a transporting device which transports the can ends in face-to-face relationship along the support and through the alternating magnetic field to induce current flow in the can ends to induction heat the can ends and thereby heat the compound material applied to the can ends, wherein the electrically nonconductive support comprises an electrically nonconductive tube.

77. Apparatus according to claim 76, wherein the electrical conductor is wrapped around the tube.

78. Induction heating apparatus, comprising:

a plurality of can ends in face-to-face relationship with each other, said can ends having compound material applied thereto;

an electrically nonconductive support structured to support the can ends while being transported in face-to-face relationship along the support;

an alternating current source;

an electrical conductor connected to the alternating current source and disposed in sufficient proximity to the support to produce an alternating magnetic field within the support; and a transporting device which transports the can ends in face-to-face relationship along the support and through the alternating magnetic field to induce current flow in the can ends to induction heat the can ends and thereby heat the compound material applied to the can ends, wherein said transporting device transports the can ends in face-to-face contact along the support.

79. Apparatus according to claim 78, wherein said transporting device comprises a means for transporting the can ends in face-to-face relationship along the support.

80. Apparatus according to claim 79, wherein said transporting means comprises a magnetic wheel which pushes the can ends in face-to-face relationship along the support.

81. Induction heating apparatus, comprising:

a plurality of can ends in face-to-face relationship with each other, said can ends having compound material applied thereto;

an electrically nonconductive support structured to support the can ends while being transported in face-to-face relationship along the support;

an alternating current source;

an electrical conductor connected to the alternating current source and disposed in sufficient proximity to the support to produce an alternating magnetic field within the support;

a transporting device which transports the can ends face-to-face relationship along the support and through the alternating magnetic field to induce current flow in the can ends to induction heat the can ends and thereby heat the compound material applied to the can ends; and a magnet disposed to produce a magnetic field within the support which is effective to cause the can ends to space apart to share the magnetic field.

82. Apparatus according to claim 33, wherein said magnetic means is disposed to produce said magnetic field downstream of said induction coil along said path of travel.

83. Apparatus according to claim 38, wherein said workpiece is one of a plurality of thin electrically conductive workpieces disposed along a path of travel, wherein said work coil of said tank circuit substantially encloses a longitudinal segment of said path of travel, said tank circuit having a resonant frequency with load between approximately 6 kHz and approximately 18 kHz, and wherein said pump means comprises:

a power supply;

an IGBT switch coupled between said power supply and said first terminal of said tank circuit, said IGBT switch defining a pump current path;

means for activating said IGBT when said oscillating voltage on said first terminal of said tank circuit reaches a first predetermined phase in each cycle; and means for deactivating said IGBT when said oscillating voltage on said first terminal of said tank circuit reaches a second predetermined phase in each cycle.

84. Apparatus according to claim 83, further comprising current limiting means for monitoring the instantaneous current in said pump current path and for shutting sown said apparatus if said instantaneous current exceeds a predetermined threshold.

85. Apparatus according to claim 83, wherein said workpieces are ferromagnetic can ends disposed in face-to-face relationship along said path of travel, further comprising:

a permanent magnet extending longitudinally along said path of travel;

a surface extending longitudinally along said path of travel, said magnet attracting said can ends to said surface; and a plurality of repetitively energized electromagnets disposed longitudinally along said path of travel, each of said electromagnets disposed to attract at least one of said can ends away from said surface when energized.

86. Apparatus according to claim 85, further comprising means for energizing said electromagnets sequentially to move said can lids in a predefined direction along said path of travel.

87. Apparatus according to claim 85, further comprising closed-loop temperature control means for monitoring the temperature of at least one of said workpieces and controlling said apparatus in response thereto.

* * * * *

UNITED STATES PATENT AND TRADEMARK OFFICE

CERTIFICATE OF CORRECTION

PATENT NO. : 5,529,703

DATED : June 25, 1996

INVENTOR(S) : Sprenger, et al.

It is certified that error appears in the above-indentified patent and that said Letters Patent is hereby corrected as shown below:

Col. 22, line 50, please delete "claim 12" and insert therefor --claim 11--.

Col. 23, line 26, please delete "claim 6" and insert therefor --claim 5--.

Col. 30, line 53, after "can ends", please insert --in--.

Col. 30, line 64, please delete "claim 38" and insert therefor --claim 5--.

Col. 31, line 18, please delete "sown" and insert therefor --down--.

Col. 32, line 17, please delete "claim 85" and insert therefor --claim 84--.

Signed and Sealed this

Fifth Day of November, 1996

Attest:

Bruce Lehman

BRUCE LEHMAN

*Attesting Officer*

*Commissioner of Patents and Trademarks*